US012770927B2

(12) United States Patent
Lee et al.

(10) Patent No.: US 12,770,927 B2
(45) Date of Patent: Oct. 20, 2026

(54) SECONDARY BATTERY HAVING BENDING STRUCTURE AND METHOD FOR MANUFACTURING SAME

(71) Applicant: INDUSTRY-UNIVERSITY COOPERATION FOUNDATION HANYANG UNIVERSITY ERICA CAMPUS, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: INDUSRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 1050 days.

(21) Appl. No.: 17/800,913

(22) PCT Filed: Feb. 22, 2021

(86) PCT No.: PCT/KR2021/002216
§ 371 (c)(1),
(2) Date: Oct. 18, 2022

(87) PCT Pub. No.: WO2021/167433
PCT Pub. Date: Aug. 26, 2021

(65) Prior Publication Data

US 2023/0088732 A1 Mar. 23, 2023

(30) Foreign Application Priority Data

Feb. 20, 2020 (KR) ........................ 10-2020-0021252
Feb. 20, 2020 (KR) ........................ 10-2020-0021253
(Continued)

(51) Int. Cl.
*H01M 10/0583* (2010.01)
*H01M 4/02* (2006.01)
(Continued)

(52) U.S. Cl.
CPC ......... *H01M 10/0583* (2013.01); *H01M 4/38* (2013.01); *H01M 4/58* (2013.01);
(Continued)

(58) Field of Classification Search
CPC ...... H01M 10/0583; H01M 4/38; H01M 4/58; H01M 10/0565; H01M 2004/027;
(Continued)

(56) References Cited

U.S. PATENT DOCUMENTS 4,049,879 A 9/1977 Thompson et al.
6,001,507 A 12/1999 Ono et al.
(Continued)

FOREIGN PATENT DOCUMENTS

CN 103441300 A 12/2013
CN 104874427 A 9/2015
(Continued)

OTHER PUBLICATIONS

Das et al., "A bionanocomposite based on 1,4-diazabicyclo-[2.2.2]-octane cellulose nanofiber cross-linked-quaternary 1 polysulfone as an anion conducting membrane", Journal of Materials Chemistry A, 4, pp. 15554-15564 (doi:10.1039/C6TA05611C) (2016).
(Continued)

*Primary Examiner* — Helen Oi K Conley
(74) *Attorney, Agent, or Firm* — Secant IP, P.L.L.C.

(57) ABSTRACT

A secondary battery is provided. The secondary battery comprises a positive electrode, a solid electrolyte, and a negative electrode, wherein: a stack structure comprising the positive electrode and the solid electrolyte stacked together
(Continued)

is provided; the stack structure is bent to provide a bending region therebetween; and the negative electrode is provided within the bending region.

13 Claims, 36 Drawing Sheets

(30) Foreign Application Priority Data

Feb. 21, 2020 (KR) ........................ 10-2020-0021894
Nov. 30, 2020 (KR) ........................ 10-2020-0164656

(51) Int. Cl.
*H01M 4/38* (2006.01)
*H01M 4/58* (2010.01)
*H01M 10/0565* (2010.01)

(52) U.S. Cl.
CPC .. *H01M 10/0565* (2013.01); *H01M 2004/027* (2013.01); *H01M 2004/028* (2013.01); *H01M 2300/0082* (2013.01)

(58) Field of Classification Search
CPC ... H01M 2004/028; H01M 2300/0082; H01M 50/4295; H01M 50/44; H01M 12/06; Y02E 60/10; Y02P 70/50
See application file for complete search history.

(56) References Cited

U.S. PATENT DOCUMENTS

| | | | | |
|---|---|---|---|---|
| 7,629,080 | B1 | 12/2009 | Allen et al. | |
| 8,257,849 | B2 | 9/2012 | Uchida | |
| 8,277,966 | B2 * | 10/2012 | Yoon | H01M 10/0431 429/94 |
| 8,716,168 | B2 | 5/2014 | Yoo et al. | |
| 9,350,025 | B2 | 5/2016 | Monden et al. | |
| 9,362,567 | B2 | 6/2016 | Kim et al. | |
| 9,751,078 | B2 | 9/2017 | Yoo et al. | |
| 9,954,231 | B2 | 4/2018 | Kim et al. | |
| 10,026,966 | B2 | 7/2018 | Kakehata et al. | |
| 10,199,692 | B2 | 2/2019 | Kim et al. | |
| 10,566,670 | B2 | 2/2020 | Choi | |
| 2010/0068461 | A1 | 3/2010 | Wallace et al. | |
| 2011/0031935 | A1 | 2/2011 | Miyoshi et al. | |
| 2014/0227595 | A1 | 8/2014 | Upreti | |
| 2014/0248539 | A1 | 9/2014 | Liu | |
| 2015/0050556 | A1 | 2/2015 | Liu et al. | |
| 2015/0140452 | A1 * | 5/2015 | Park | H01M 12/02 29/623.5 |
| 2016/0322684 | A1 | 11/2016 | Choi | |
| 2016/0322685 | A1 | 11/2016 | Choi | |
| 2017/0141429 | A1 | 5/2017 | Lee et al. | |
| 2017/0373320 | A1 | 12/2017 | Choi et al. | |
| 2018/0108941 | A1 | 4/2018 | Lee et al. | |
| 2018/0114967 | A1 | 4/2018 | Kim et al. | |
| 2019/0067737 | A1 | 2/2019 | Zhi et al. | |
| 2019/0134609 | A1 | 5/2019 | Yamauchi et al. | |
| 2019/0181520 | A1 | 6/2019 | Baik et al. | |
| 2019/0273297 | A1 | 9/2019 | Weisenstein et al. | |
| 2019/0309426 | A1 | 10/2019 | Jin et al. | |
| 2020/0112050 | A1 | 4/2020 | Hu et al. | |
| 2021/0408567 | A1 | 12/2021 | Lee et al. | |
| 2022/0059888 | A1 | 2/2022 | Iwata et al. | |

FOREIGN PATENT DOCUMENTS

| | | | | |
|---|---|---|---|---|
| CN | 105449228 | A | 3/2016 | |
| CN | 105733004 | A | 7/2016 | |
| CN | 107565159 | A | 1/2018 | |
| CN | 107873104 | A | 4/2018 | |
| CN | 110227454 | A | 9/2019 | |
| CN | 106784611 | B | 10/2019 | |
| EP | 2395588 | A1 | 12/2011 | |
| EP | 2089258 | * | 3/2018 | H01M 2/16 |
| JP | 2005154710 | | 6/2005 | |
| JP | 2006156041 | | 6/2006 | |
| JP | 2009541198 | | 11/2009 | |
| JP | 2015504568 | A2 | 2/2015 | |
| JP | 2015198056 | A2 | 11/2015 | |
| JP | 5924731 | B2 | 5/2016 | |
| JP | 6041813 | | 12/2016 | |
| JP | 2017516274 | | 6/2017 | |
| JP | 6303278 | B2 | 4/2018 | |
| KR | 10-2007-0110568 | A | 11/2007 | |
| KR | 10-2011-0083940 | A | 7/2011 | |
| KR | 10-2012-0094249 | A | 8/2012 | |
| KR | 10-2012-0139066 | A | 12/2012 | |
| KR | 10-2013-0064019 | A | 6/2013 | |
| KR | 10-1281772 | B1 | 7/2013 | |
| KR | 10-2013-0118582 | A | 10/2013 | |
| KR | 10-2014-0046213 | A | 4/2014 | |
| KR | 10-2014-0137427 | A | 12/2014 | |
| KR | 10-2015-0031213 | A | 3/2015 | |
| KR | 10-1572545 | B1 | 11/2015 | |
| KR | 10-2016-0122009 | A | 10/2016 | |
| KR | 10-2016-0128164 | A | 11/2016 | |
| KR | 10-1733492 | B1 | 5/2017 | |
| KR | 101734301 | | 5/2017 | |
| KR | 10-2018-0000941 | A | 1/2018 | |
| KR | 10-2018-0004407 | A | 1/2018 | |
| KR | 10-1827155 | B1 | 2/2018 | |
| KR | 10-2019-0139586 | A | 12/2019 | |
| KR | 10-2019-0139911 | A | 12/2019 | |
| KR | 10-2019-0142669 | A | 12/2019 | |
| WO | 2014200198 | | 12/2014 | |

OTHER PUBLICATIONS

Lai et al., "Nanocomposite films based on TEMPO-mediated oxidized bacterial cellulose and chitosan", Cellulose, 21:2757-2772 (2014).
1 Notice of Allowance, U.S. Appl. No. 17/798,424, dated Dec. 30, 2025 (10 pages).
U.S. Appl. No. 17/418,304, Notice of Allowance dated Jun. 4, 2025 (11 pages).
M. Minakshi et al., "Synthesis and characterization of olivine LiNiPO1 for aqueous rechargeable battery", Electrochimica Acta, 56, Jan. 31, 2011, pp. 4356-4360.
Kibsgaard et al., "Molybdenum Phosphosulfide: An Active, Acid-Stable, Earth-Abundant Catalyst for the Hydrogen Evolution Reaction", Angew. Chem. Int. Ed., 53, 1-6 (2014).
Kotatha et al., "Preparation and characterization of gel electrolyte with bacterial cellulose coated with alternating layers of chitosan and alginate for electric double-layer capacitors", Res Chem Intermed., 44:4971-4987, https://doi.org/10.1007/s11164-018-3348-6 (2018).
Luo et al., "Characterization of TEMPO-oxidized bacterial cellulose scaffolds for tissue engineering applications", Materials Chemistry and Physics, http://dx.doi.org/10.1016/j.matchemphys.2013.09.012 (2013).
Patel et al., "Electrochemically active and robust cobalt doped copper phosphosulfide electrocatalysts for hydrogen evolution reaction in electrolytic and photoelectrochemical water splitting", International Journal of Hydrogen Energy, https://doi.org/10.1016/j.ijhydene.2018.02.147 (2018).
Yue et al., "Sulfonated bacterial cellulose/polyaniline composite membrane for use as gel polymer electrolyte", Composites Science and Technology, 145 122-131 (2017).
Muhmed et al., "Emerging chitosan and cellulose green materials for ion exchange membrane fuel cell: a review", Energ. Ecol. Environ., https://doi.org/10.1007/s40974-019-00127-4 (Jul. 22, 2019).
International Search Report and Written Opinion for International Patent Application PCT/KR2021/002216, mailed Jun. 9, 2021 (7 pages).
U.S. Appl. No. 17/798,424 (English translation of originally-filed application papers), filed Aug. 9, 2022 (108 pages).
U.S. Appl. No. 17/800,926 (English translation of originally-filed application papers), filed Aug. 19, 2022 (132 pages).

(56) References Cited

OTHER PUBLICATIONS

U.S. Appl. No. 17/800,915 (English translation of originally-filed application papers), filed Aug. 19, 2022 (79 pages).
Li et al., "Multifunctional Transition Metal-Based Phosphides in Energy-Related Electrocatalysis", Advanced Energy Materials, 10, 1902104 (2020).
Fernandes et al., "Novel transparent nanocomposite films based on chitosan and bacterial cellulose", Green Chem., 11, 2023-2029 (2009).
U.S. Appl. No. 18/418,304, Notice of Allowance dated Jun. 4, 2025 (11 pages).
Kim, Hyeyun et al., ACS Applied Energy Materials, "Lithium Ion Battery Separators Based on Carboxylated Cellulose Nanofibers from Wood", 2019, vol. 2, pp. 1241-1250 (Year: 2019).
Kim, Jaehwan et al., J. Polym. Res., "Preparation and characterization of a Bacterial cellulose/Chitosan composite for potential biomedical application", 2011, vol. 18, pp. 739-744 (Year: 2011).
Phisalaphong, Muenduen et al., Carbohydrate Polymers, "Biosynthesis and characterization of bacteria cellulose-chitosan film", 2008, vol. 74, pp. 482-488 (Year: 2008).
Torres, F.G et al., Materials Science & Engineering C, "Bacterial cellulose nanocomposites: An all-nano type of material", 2019, vol. 98, pp. 1277-1293 (Year: 2019).
Xu et al., "Sulfur-doped Cu3P | S electrocatalyst for hydrogen evolution reaction", Materials Research Express, vol. 6, No. 7, p. 75501 (doi: 10.1088/2053-1591/ab1293) (2019).
Extended European Search Report, Europe Patent Application EP 21 756 905.2 (search report dated Apr. 16, 2024) (9 pages).
Foresti et al., "Applications of bacterial cellulose as precursor of carbon and composites with metal oxide, metal sulfide and metal nanoparticles: A review of recent advances", Carbohydrate Polymers, 157, 447-467 (2017).
Das et al., "Quaternized cellulose and graphene oxide crosslinked polyphenylene oxide based anion exchange membrane" and "Electronic Supplementary Information", Scientific Reports, vol. 9, 18 pages (2019).
Notice of Allowance, U.S. Appl. No. 17/800,915, dated Jul. 8, 2026 (7 pages).

* cited by examiner (a)

(b)

(c)

CBCs bCBCs qCBCs oCBCs qCBCs cBCs-x (0 < x < 1)

SECONDARY BATTERY HAVING BENDING STRUCTURE AND METHOD FOR MANUFACTURING SAME

BACKGROUND OF THE INVENTION

1. Field of the Invention

The present application relates to a secondary battery and a method for manufacturing the same, and more particularly, to a secondary battery having a bending structure and a method for manufacturing the same.

2. Description of the Related Art

As mid-to-large high-energy applications such as electric vehicles and energy storage systems (ESS) are rapidly growing beyond the existing secondary batteries for small devices and home appliances, the market value of the secondary battery industry was only about 22 billion dollars in 2018, but is expected to grow to about 118 billion dollars by 2025. As such, in order for secondary batteries to be used as medium and large-sized energy storage media, price competitiveness, energy density and stability that are significantly improved more than a current level are required.

According to the technical needs, various electrodes for secondary batteries have been developed.

For example, Korean Unexamined Patent Publication No. 10-2019-0139586 discloses an electrode for a lithium-air battery, which includes a carbon nanotube and RuO2 deposited on a surface of the carbon nanotube, in which the RuO2 is deposited on a defective surface site of the carbon nanotube; the RuO2 has a particle size of 1.0 to 4.0 nm; and the RuO2 inhibits carbon decomposition at a surface defect site of the carbon nanotube and promotes the decomposition of Li2O2 formed on the surface of the carbon nanotube.

SUMMARY OF THE INVENTION

One technical object of the present application is to provide a secondary battery having a bending structure and a method for manufacturing the same.

Another technical object of the present application is to provide a secondary battery having a bending structure with a low manufacturing cost and a simple manufacturing process, and a method for manufacturing the same.

Still another technical object of the present application is to provide a secondary battery having a bending structure with an enhanced charge/discharge capacity and a method for manufacturing the same.

Still another technical object of the present application is to provide a secondary battery having a bending structure with a long lifespan and high stability and a method for manufacturing the same.

The technical objects of the present application are not limited to the above.

To solve the above technical objects, the present application may provide a secondary battery.

According to one embodiment, the secondary battery may include a positive electrode, a solid electrolyte, and a negative electrode, in which: a stack structure having the positive electrode and the solid electrolyte stacked together is provided; the stack structure is bent to provide a bending region therebetween; and the negative electrode is provided within the bending region.

According to one embodiment, an inner surface of the bending region may include the solid electrolyte, and thus the negative electrode may come into contact with the solid electrolyte.

According to one embodiment, the stack structure having the positive electrode and the solid electrolyte stacked together, and the negative electrode provided in the bending region may be defined as a unit cell, in which the unit cell may be provided in plurality, in which the plurality of unit cells may be stacked on each other so that the positive electrodes included in the unit cells adjacent to each other may come into contact with each other.

According to one embodiment, the plurality of the stacked unit cells may be defined as a cell structure, in which the cell structure may be provided in plurality, in which the plurality of cell structures may be disposed so that the positive electrodes included in the cell structures may come into contact with each other.

According to one embodiment, the stack structure having the positive electrode and the solid electrolyte stacked together, and the negative electrode provided in the bending region may form a unit cell, in which the unit cell may be provided in plurality, in which the plurality of unit cells may be stacked on each other so that the positive electrodes included in the unit cells adjacent to each other may be adjacent to each other, and the secondary battery may further include a gas diffusion layer disposed between the unit cells adjacent to each other.

According to one embodiment, the plurality of stacked unit cells and the gas diffusion layer disposed between the unit cells may be defined as a cell structure, in which the cell structure may be disposed so that the positive electrodes may come into contact with each other.

According to one embodiment, the stack structure may be bent toward a first side and a second side facing the first side, in which the negative electrode may be provided in a first bending region bent toward the first side, and the positive electrodes of the stack structure may come into contact with each other and may be folded in a second bending region bent toward the second side.

According to one embodiment, the stack structure may be alternately and repeatedly stacked toward the first side and the second side to provide the plurality of first bending regions and the plurality of second bending regions, in which the negative electrode may be provided in at least one of the plurality of first bending regions, and the positive electrodes of the stack structure may come into contact with each other in the plurality of second bending regions.

According to one embodiment, the stack structure having the positive electrode and the solid electrolyte stacked together, and the plurality of negative electrodes provided in the plurality of first bending regions may be defined as a cell structure, in which the cell structure may be provided in plurality, in which the plurality of cell structures may be disposed so that the positive electrodes included in the cell structures may come into contact with each other.

According to one embodiment, the stack structure may be alternately and repeatedly stacked toward the first side and the second side to provide the plurality of first bending regions and the plurality of second bending regions, in which the plurality of negative electrodes may be provided in the plurality of first bending regions, respectively, and a plurality of gas diffusion layers may be provided within the plurality of second bending regions.

According to one embodiment, the stack structure, the plurality of negative electrodes provided in the plurality of first bending regions, and the plurality of gas diffusion layers provided in the plurality of second bending regions may be defined as a cell structure, in which the cell structure may be provided in plurality, in which the plurality of cell structures may be disposed so that the positive electrodes included in the cell structures may come into contact with each other.

According to one embodiment, the secondary battery may include a positive electrode, a solid electrolyte, and a negative electrode, in which a stack structure having the positive electrode, the solid electrolyte, and the negative electrode stacked together may be provided, in which the stack structure may be bent toward a first side and a second side facing the first side, in which the negative electrodes may come into contact with each other and may be folded in a first bending region bent toward the first side.

According to one embodiment, the secondary battery may further include a gas diffusion layer provided in the second bending region bent toward the second side.

According to one embodiment, the positive electrode may include a compound of copper, phosphorus, and sulfur, and use oxygen as a positive electrode active material; the solid electrolyte may include bacterial cellulose; and the negative electrode may include zinc.

According to one embodiment, the positive electrode and the solid electrolyte may be in a form of a membrane in which a plurality of fibers form a network.

A secondary battery according to an embodiment of the present application may include a positive electrode, a solid electrolyte, and a negative electrode, in which the positive electrode and the solid electrolyte may be in the form of a membrane in which a plurality of fibers form a network, and the negative electrode may have a plurality of grooves. Accordingly, the positive electrode, the solid electrolyte, and the negative electrode may have high flexibility and mechanical properties.

In the secondary battery, a stack structure defined by having the positive electrode and the solid electrolyte stacked together may be bent. A bending region may be provided between the stack structures, and the negative electrode may be provided in the bending region.

Accordingly, both surfaces of the negative electrode may be spaced apart from the positive electrode with the solid electrolyte interposed therebetween, thereby improving charge/discharge properties and lifespan properties of the secondary battery.

DETAILED DESCRIPTION OF THE EXEMPLARY EMBODIMENTS

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

Further, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. In addition, the term "connection" used herein may include the meaning of indirectly connecting a plurality of components, and directly connecting a plurality of components.

Further, in the following description of the present invention, a detailed description of known functions or configurations incorporated herein will be omitted when it may make the subject matter of the present invention unnecessarily unclear.

Figure 1A:
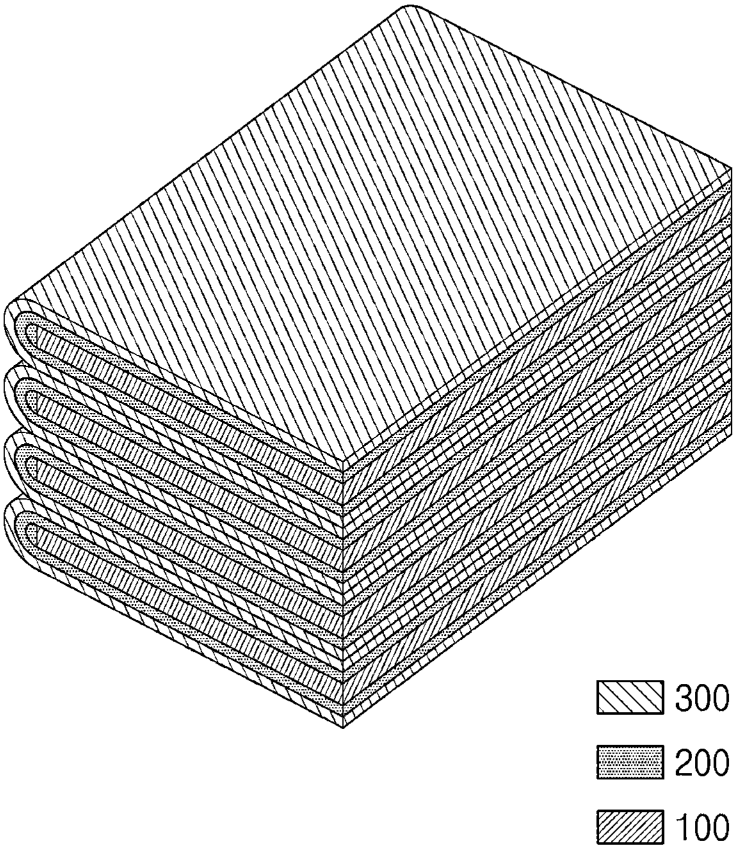
FIGS. 1A and 1B are views for explaining a secondary battery having a bending structure according to a first embodiment of the present application.
Figure 1B:
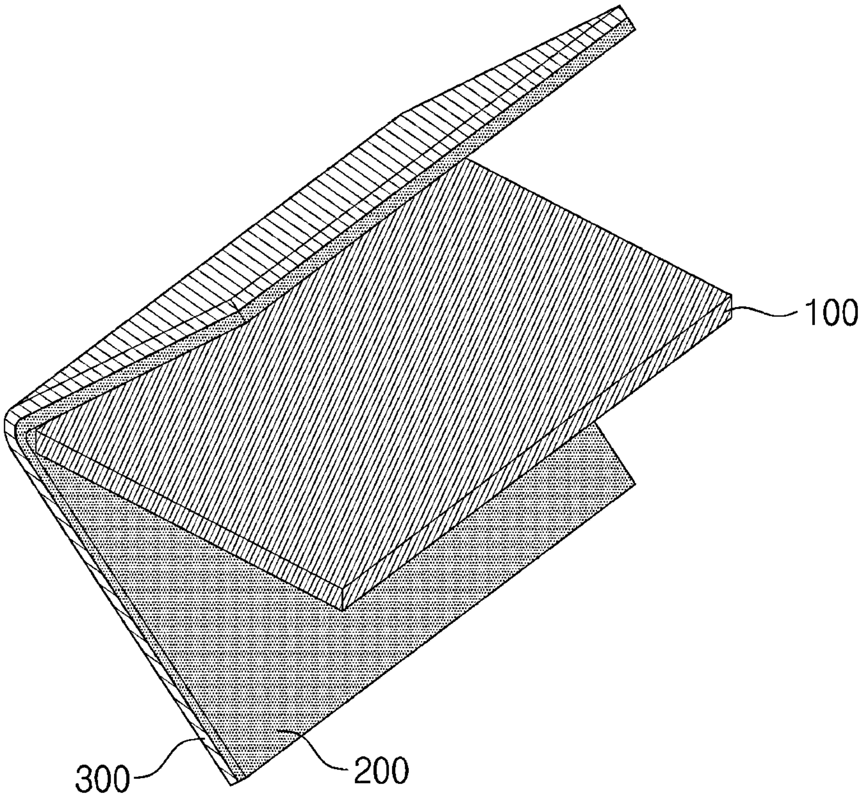

FIGS. 1A and 1B are views for explaining a secondary battery having a bending structure according to a first embodiment of the present application.

Referring to FIGS. 1A and 1B, the secondary battery having a bending structure according to a first embodiment may include a positive electrode 300, a solid electrolyte 200, and a negative electrode 100.

The positive electrode 300 and the solid electrolyte 200 may be stacked together to define a stack structure.

The stack structure including the positive electrode 300 and the solid electrolyte 200 may be bent to provide a bending region therebetween. As shown in FIGS. 1A and 1B, an inner surface of the bending region may be formed of the solid electrolyte 200.

The negative electrode 100 may be provided in the bending region formed of the solid electrolyte 200. In other words, the negative electrode 100 may be provided in a sandwiched form to the stack structure, and the negative electrode 100 may come into contact with the solid electrolyte 200. In other words, the negative electrode 100 may be spaced apart from the positive electrode 300 with the solid electrolyte 200 interposed therebetween. Both a first surface of the negative electrode 100 and a second surface facing the first surface may be spaced apart from the positive electrode 300 with the solid electrolyte 200 interposed therebetween.

The stack structure having the positive electrode 300 and the solid electrolyte 200 stacked together, and the negative electrode provided in the bending region may be defined as a unit cell.

The unit cell may be provided in plurality as shown in FIG. 1A, and the plurality of unit cells may be stacked. The stacked unit cells may be defined as one cell structure. In this case, the plurality of unit cells may be stacked on each other so that the positive electrodes 300 included in the unit cells adjacent to each other may come into contact with each other.

Accordingly, the positive electrodes 300 included in the different unit cells may be electrically connected to each other, and the negative electrodes 100 included in the different unit cells may be spaced apart from each other.

A lead wire may be provided at open sides of the plurality of negative electrodes 100 spaced apart from each other, and thus the plurality of negative electrodes 100 spaced apart from each other may be electrically connected.

According to an embodiment of the present application, as described above, the negative electrode 100 may be inserted into the bending region of the stack structure including the positive electrode 300 and the solid electrolyte 200. Accordingly, the solid electrolyte 200 may be provided between the first surface of the negative electrode 100 and the positive electrode 300 and between the second surface of the negative electrode 100 and the positive electrode 300. Thus, in a process of charging and discharging the secondary battery, ions (e.g., OH—) may migrate between the first surface of the negative electrode 100 and the positive electrode 300 and between the second surface of the negative electrode 100 and the positive electrode 300, thereby improving a charge/discharge capacity of the secondary battery.

Figure 2:
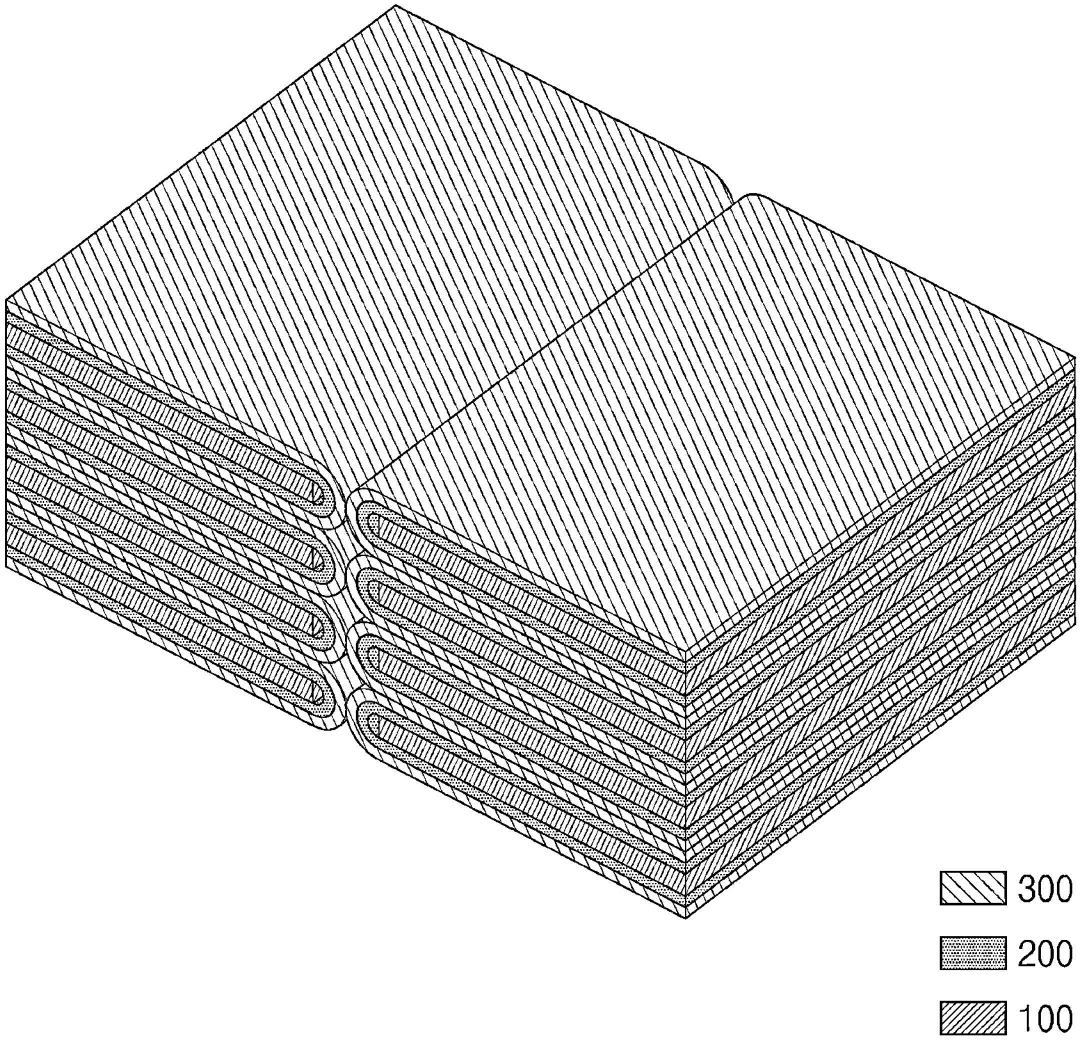
FIG. 2 is a view for explaining a secondary battery having a bending structure according to a second embodiment of the present application.

FIG. 2 is a view for explaining a secondary battery having a bending structure according to a second embodiment of the present application.

Referring to FIG. 2, the cell structure according to a first embodiment as described with reference to FIGS. 1A and 1B may be provided in plurality.

The cell structures provided in plurality may be disposed to face each other. Specifically, the plurality of cell structures may be disposed so that the positive electrodes 300 included in the cell structure may come into contact with each other as shown in FIG. 2.

Accordingly, the positive electrodes 300 included in the different unit cells as well as the positive electrodes 300 included in the different cell structures may be electrically connected without performing an additional process.

As described above, the different cell structures may be disposed so that the positive electrodes 300 may come into contact with each other, thereby improving an energy density of the secondary battery.

Figure 3:
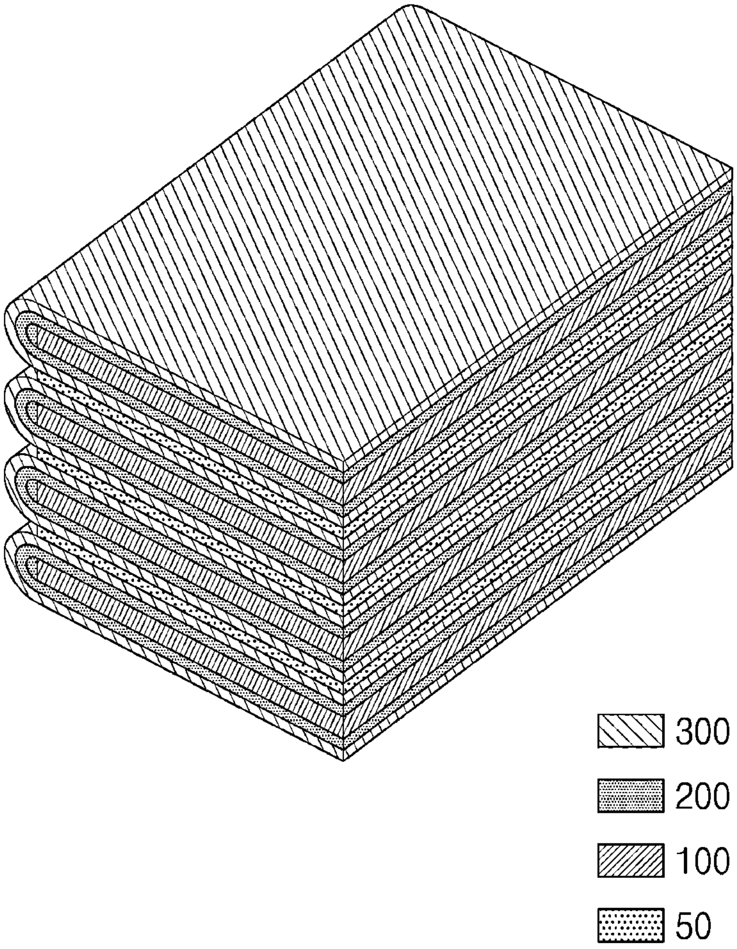
FIG. 3 is a view for explaining a secondary battery having a bending structure according to a third embodiment of the present application.

FIG. 3 is a view for explaining a secondary battery having a bending structure according to a third embodiment of the present application.

Referring to FIG. 3, the cell structure according to a first embodiment as described with reference to FIGS. 1A and 1B may be provided and a gas diffusion layer 50 may be provided between the unit cells. Specifically, the plurality of unit cells may be stacked on each other so that the positive electrodes 300 included in the unit cells adjacent to each other may come into contact with each other, and the gas diffusion layer 50 may be provided between the positive electrodes 300 adjacent to each other.

The unit cell may be provided in plurality as shown in FIG. 3, and the plurality of unit cells may be stacked. The stacked unit cells and the gas diffusion layer 50 between the unit cells may be defined as one cell structure.

Oxygen may be easily and smoothly supplied to the positive electrode 300 of the secondary battery having a bending structure according to an embodiment of the present application, which uses oxygen as a positive electrode active material, by the gas diffusion layer 50, and thus the charge/discharge properties of the secondary battery may be improved.

Figure 4:
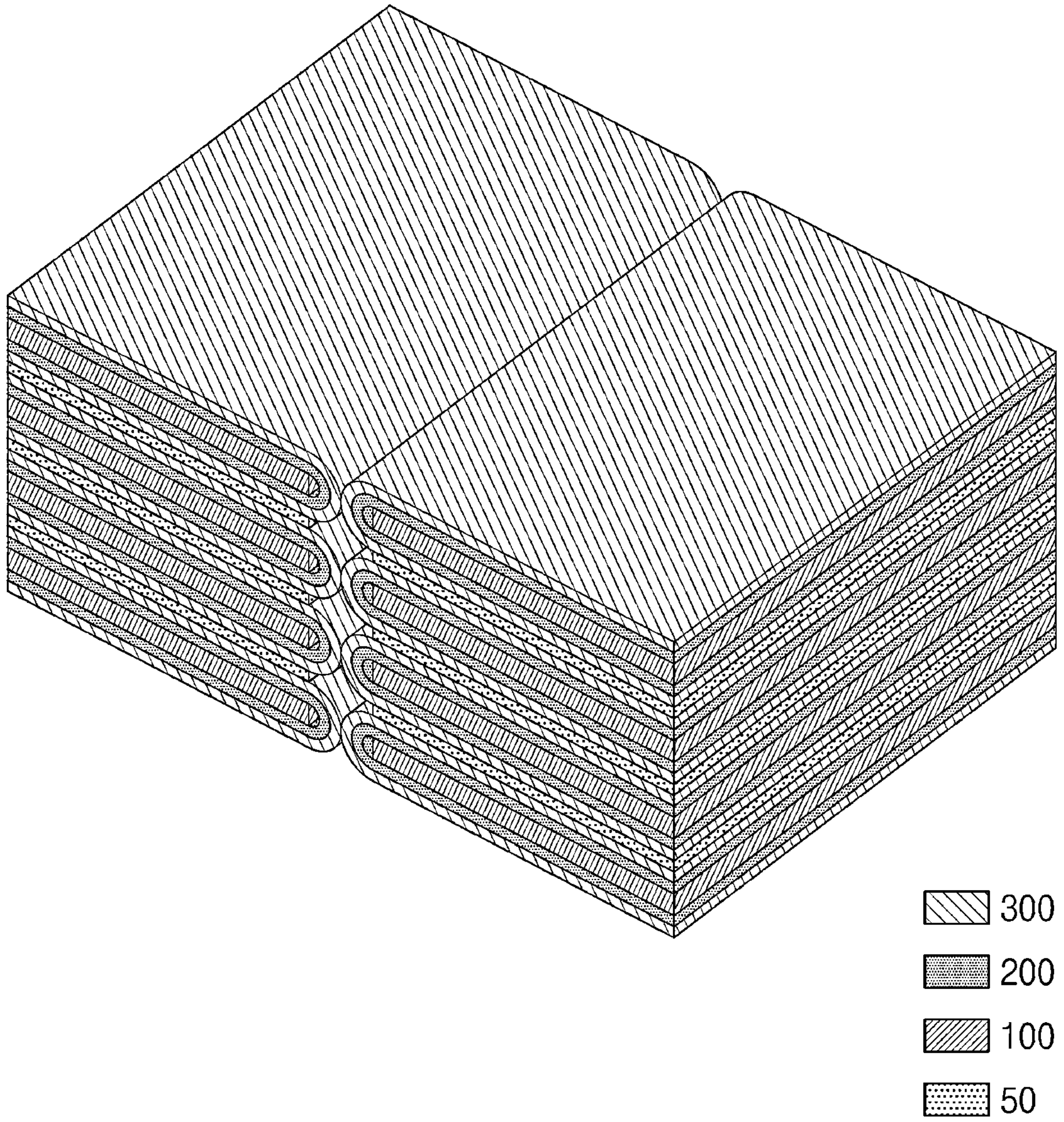
FIG. 4 is a view for explaining a secondary battery having a bending structure according to a fourth embodiment of the present application.

FIG. 4 is a view for explaining a secondary battery having a bending structure according to a fourth embodiment of the present application.

Referring to FIG. 4, the cell structure according to a third embodiment as described with reference to FIG. 3 may be provided in plurality.

The cell structures provided in plurality may be disposed to face each other. Specifically, the plurality of cell structures may be disposed so that the positive electrodes 300 included in the cell structure may come into contact with each other as shown in FIG. 4.

Accordingly, the positive electrodes 300 included in the different unit cells as well as the positive electrodes 300 included in the different cell structures may be electrically connected without performing an additional process.

As described above, the different cell structures may be disposed so that the positive electrodes 300 may come into contact with each other, thereby improving an energy density of the secondary battery.

Figure 5A:
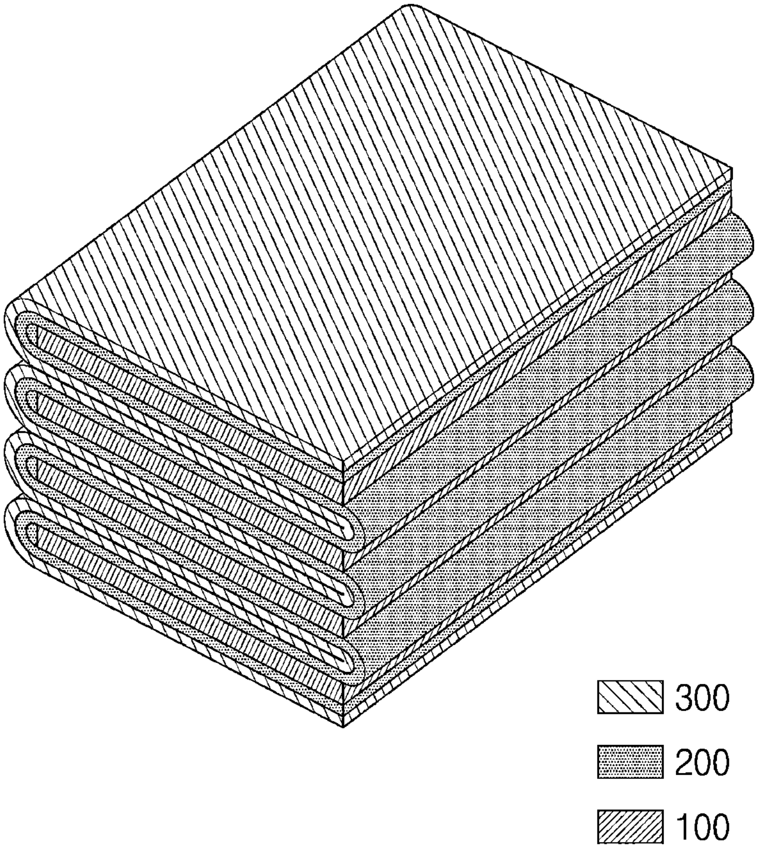
FIGS. 5A and 5B are views for explaining a secondary battery having a bending structure according to a fifth embodiment of the present application.
Figure 5B:
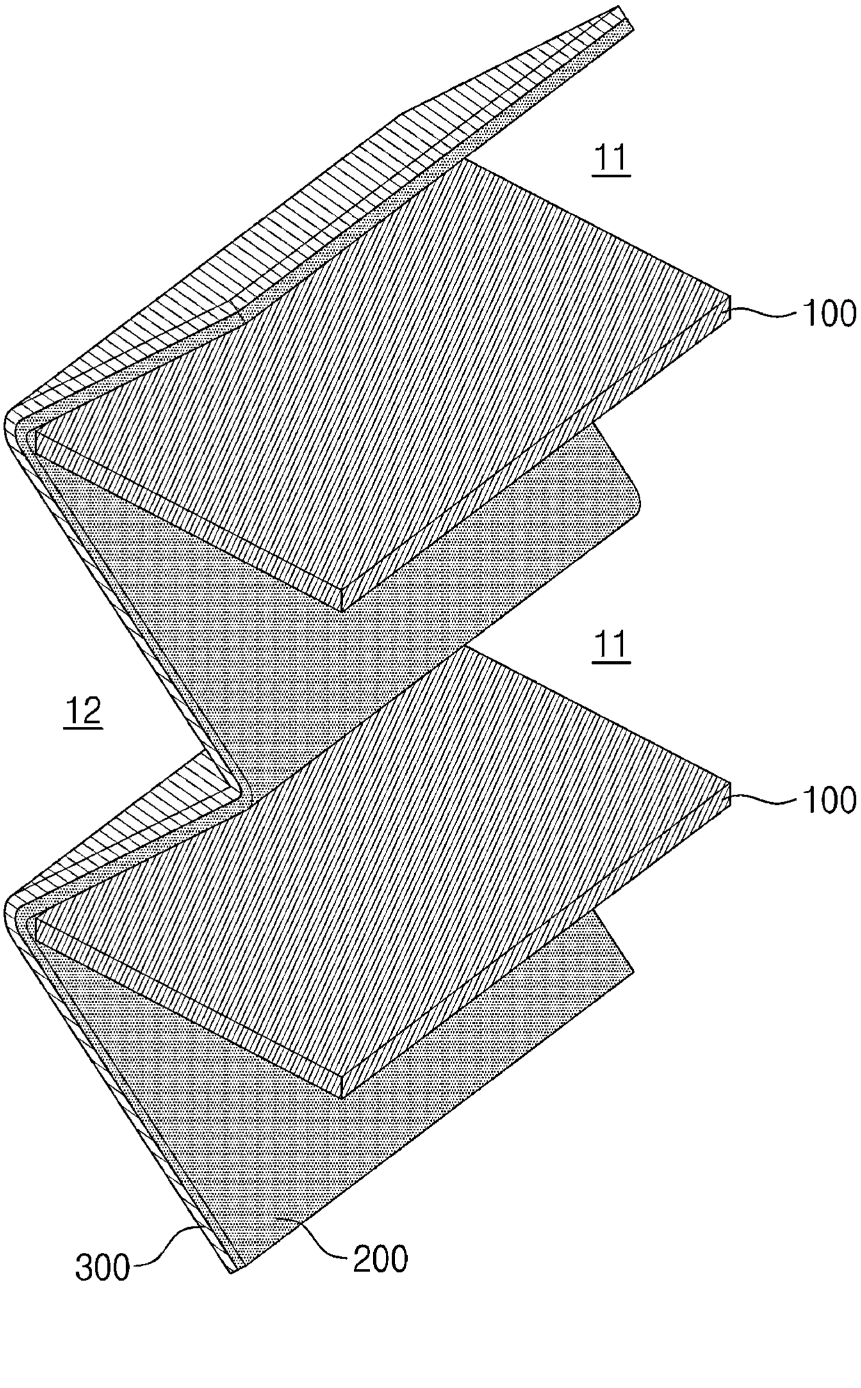

FIGS. 5A and 5B are views for explaining a secondary battery having a bending structure according to a fifth embodiment of the present application.

Referring to FIGS. 5A and 5B, the secondary battery having a bending structure according to a fifth embodiment may include a positive electrode 300, a solid electrolyte 200, and a negative electrode 100, and the positive electrode 300 and the solid electrolyte 200 may be stacked together to define a stack structure.

The stack structure may be bent toward a first side and a second side facing the first side. Accordingly, a first bending region 11 in which the stack structure is bent toward the first side may be provided, and a second bending region 12 in which the stack structure is bent toward the second side may be provided.

The negative electrode 100 may be provided in the first bending region 11. As shown in FIG. 5B, the first bending region 11 may be open toward the first side, and the negative electrode 100 may be provided in the open first bending region 11.

The positive electrodes 300 of the stack structure may come into contact with each other and folded in the second bending region 12. In other words, nothing may be provided in the second bending region 12, and the positive electrodes 300 may come into contact with each other by being folded as they are.

The stack structures may be alternately and repeatedly bent toward the first side and the second side to provide the plurality of first bending regions 11 and the plurality of second bending regions 12. The negative electrode 100 may be provided in at least one of the plurality of first bending regions 11, and the positive electrodes 300 of the stack structure may come into contact with each other in the plurality of second bending regions 12.

The negative electrode 100 may be provided in a sandwiched form to the stack structure, and the positive electrode 300 and the solid electrolyte 200, which are included in the stack structure, may be continuously provided.

The stack structure having the positive electrode 300 and the solid electrolyte 200 stacked together, and the plurality of negative electrodes 100 provided in the first bending region 11 may be defined as a cell structure.

According to an embodiment of the present application, the stack structure having the positive electrode 300 and the solid electrolyte 200 stacked together may be bent toward the first side and the second side, and thus the negative electrode 100 may be inserted into the first bending region 11. Accordingly, the secondary battery may be manufactured by a simple process of bending the stack structure and inserting the negative electrode 100, and the secondary battery may be manufactured by a continuous process, thereby facilitating mass production.

In addition, as will be described later in Experimental Example 4, a compound of Cu, P, and S included in the positive electrode 300 may be coated on a metal mesh, and external air and/or oxygen may be easily supplied to the positive electrode 300 by the metal mesh. Accordingly, the secondary battery having a bending structure according to the fifth embodiment of the present application may be implemented with the gas diffusion layer omitted.

However, it means that the gas diffusion layer may be omitted in the secondary battery having a bending structure according to the fifth embodiment of the present application, and it is obvious that the technical idea according to an embodiment of the present application may not exclude a case in which the gas diffusion layer is included.

Figure 6:
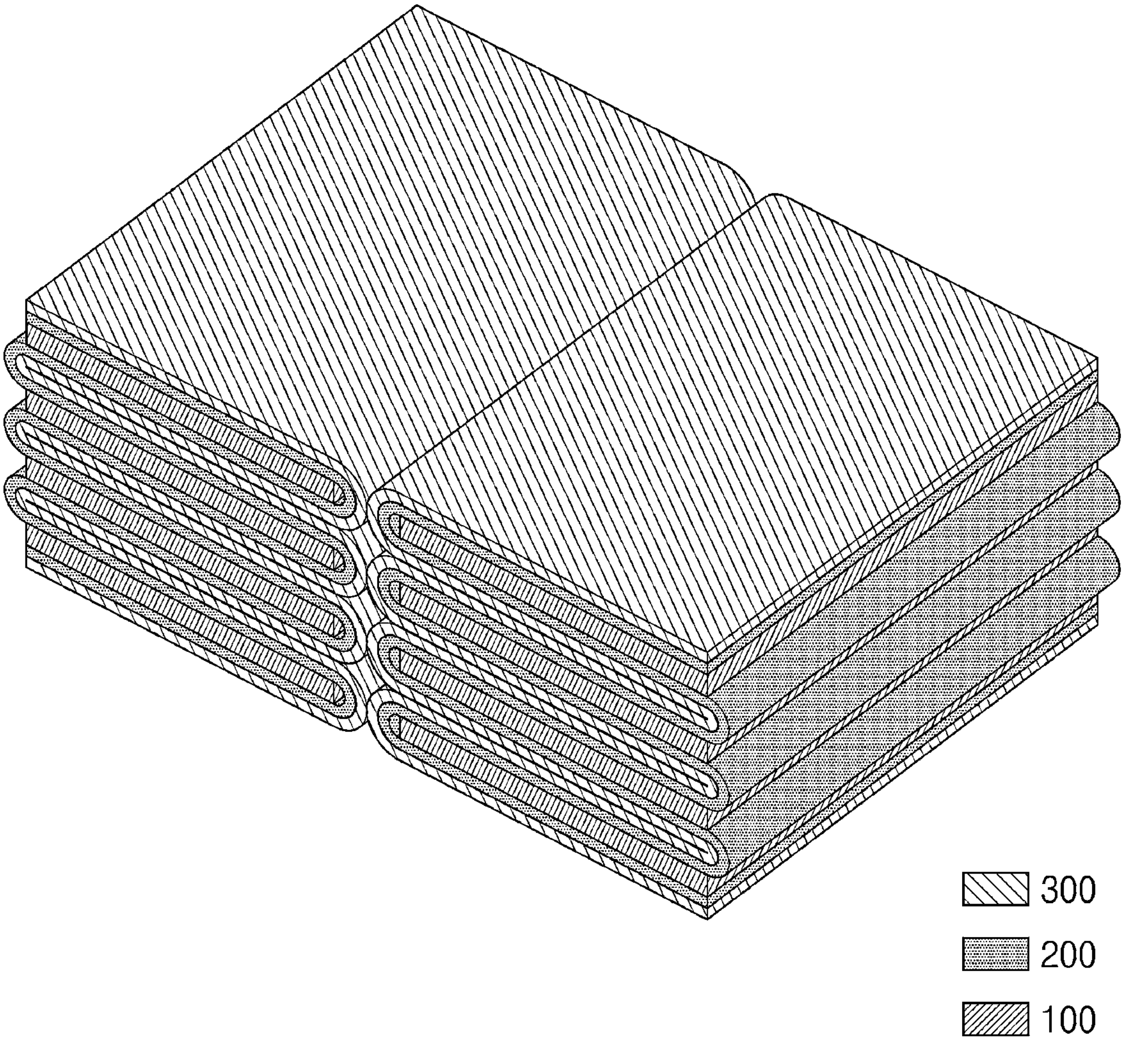
FIG. 6 is a view for explaining a secondary battery having a bending structure according to a sixth embodiment of the present application.

FIG. 6 is a view for explaining a secondary battery having a bending structure according to a sixth embodiment of the present application.

Referring to FIG. 6, the cell structure according to a fifth embodiment as described with reference to FIGS. 5A and 5B may be provided in plurality.

The cell structures provided in plurality may be disposed to face each other. Specifically, the plurality of cell structures may be disposed so that the positive electrodes 300 included in the cell structure may come into contact with each other as shown in FIG. 6.

Accordingly, the positive electrodes 300 included in the different unit cells as well as the positive electrodes 300 included in the different cell structures may be electrically connected without performing an additional process.

Figure 7A:
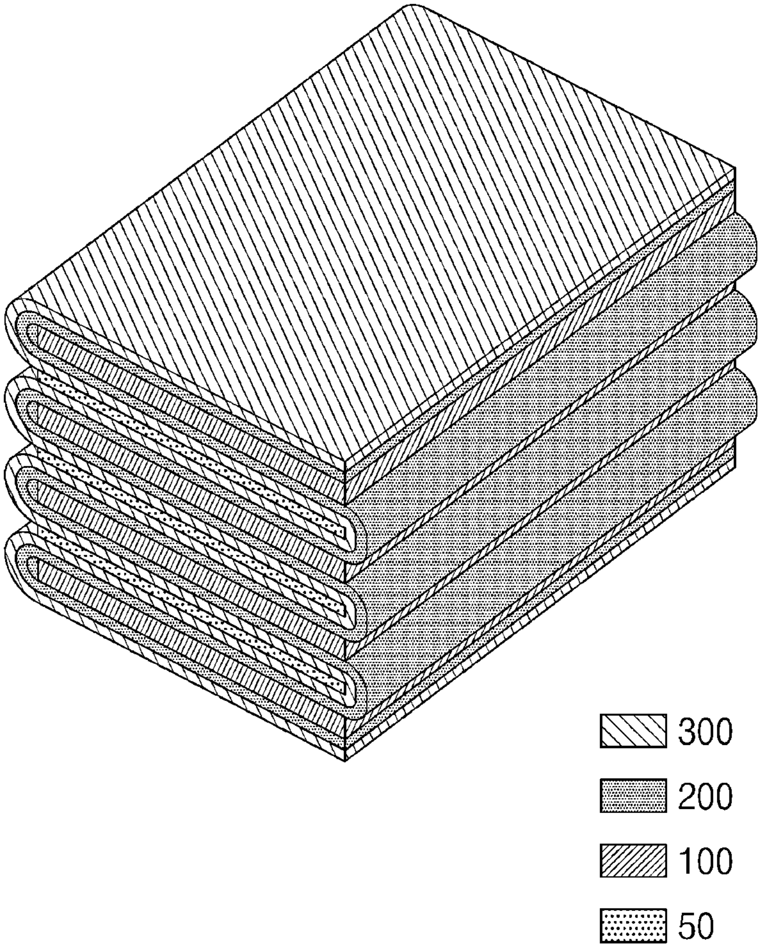
FIGS. 7A and 7B are views for explaining a secondary battery having a bending structure according to a seventh embodiment of the present application.
Figure 7B:
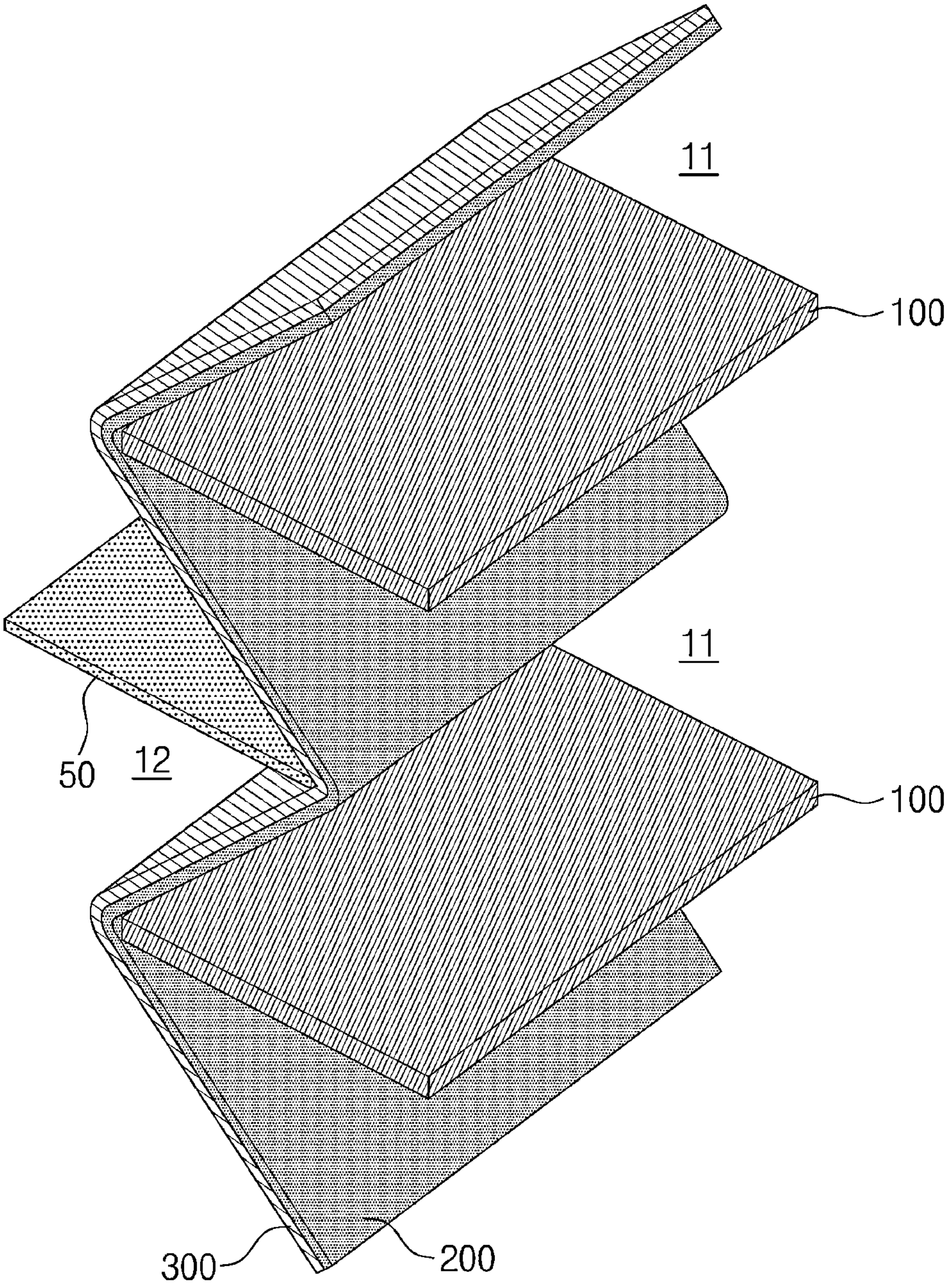

FIGS. 7A and 7B are views for explaining a secondary battery having a bending structure according to a seventh embodiment of the present application.

Referring to FIGS. 7A and 7B, the cell structure according to a fifth embodiment as described with reference to FIGS. 5A and 5B may be provided and the gas diffusion layer 50 may be provided in the second bending region 12. Specifically, unlike those described with reference to FIGS. 5A and 5B, the gas diffusion layer 50 may be provided in the second bending region 12 in which the stack structure is bent toward the second side, and thus the positive electrodes 300 may not come into contact with each other in the second bending region 12 as shown in FIG. 7A.

Oxygen may be easily and smoothly supplied to the positive electrode 300 of the secondary battery having a bending structure according to an embodiment of the present application, which uses oxygen as a positive electrode active material, by the gas diffusion layer 50, and thus the charge/discharge properties of the secondary battery may be improved.

Figure 8:
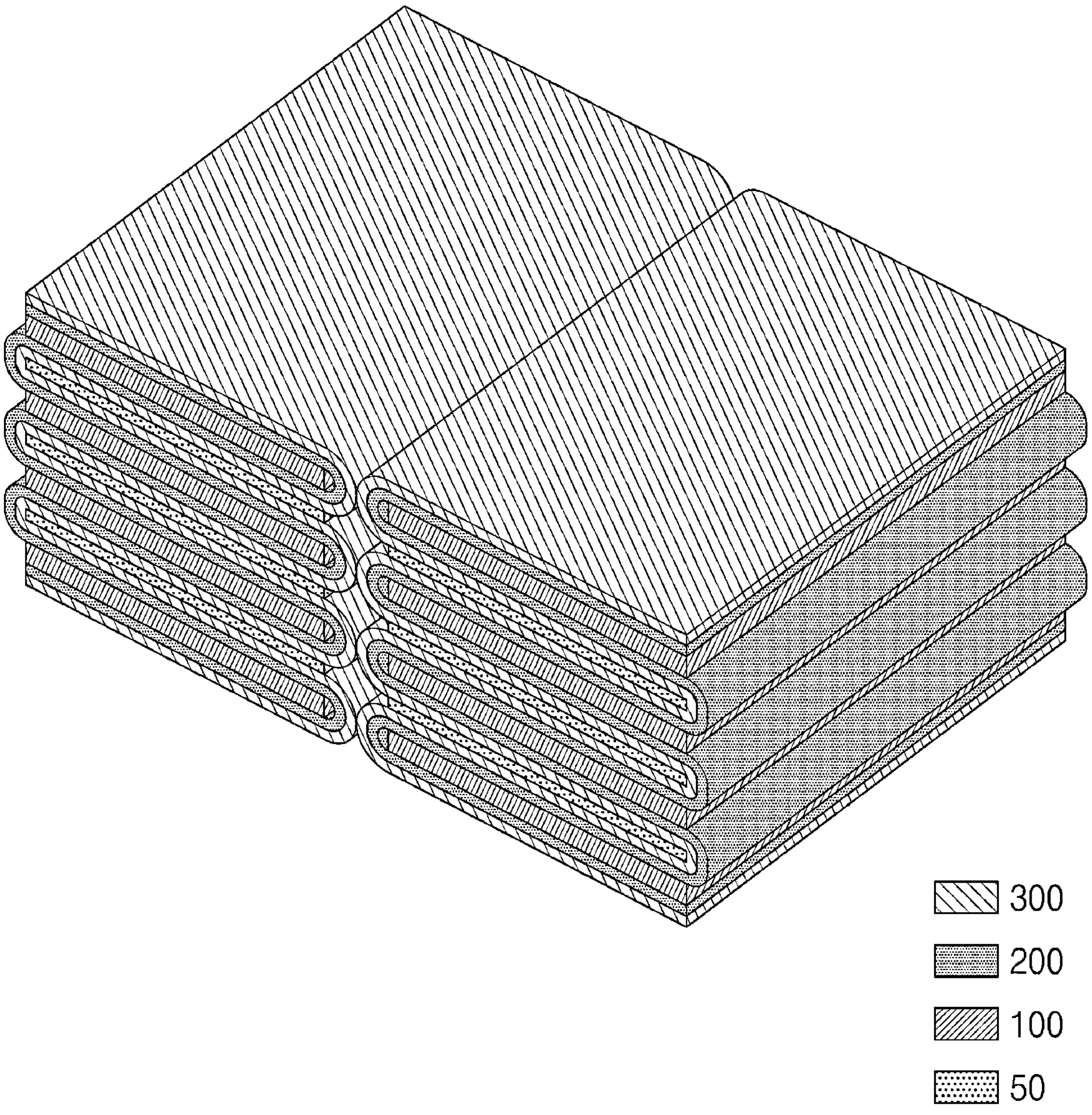
FIG. 8 is a view for explaining a secondary battery having a bending structure according to an eighth embodiment of the present application.

FIG. 8 is a view for explaining a secondary battery having a bending structure according to an eighth embodiment of the present application.

Referring to FIG. 8, the cell structure according to a seventh embodiment as described with reference to FIGS. 7A and 7B may be provided in plurality.

The cell structures provided in plurality may be disposed to face each other. Specifically, the plurality of cell structures may be disposed so that the positive electrodes 300 included in the cell structure may come into contact with each other as shown in FIG. 8.

Accordingly, an energy density of the secondary battery may be improved.

Figure 9A:
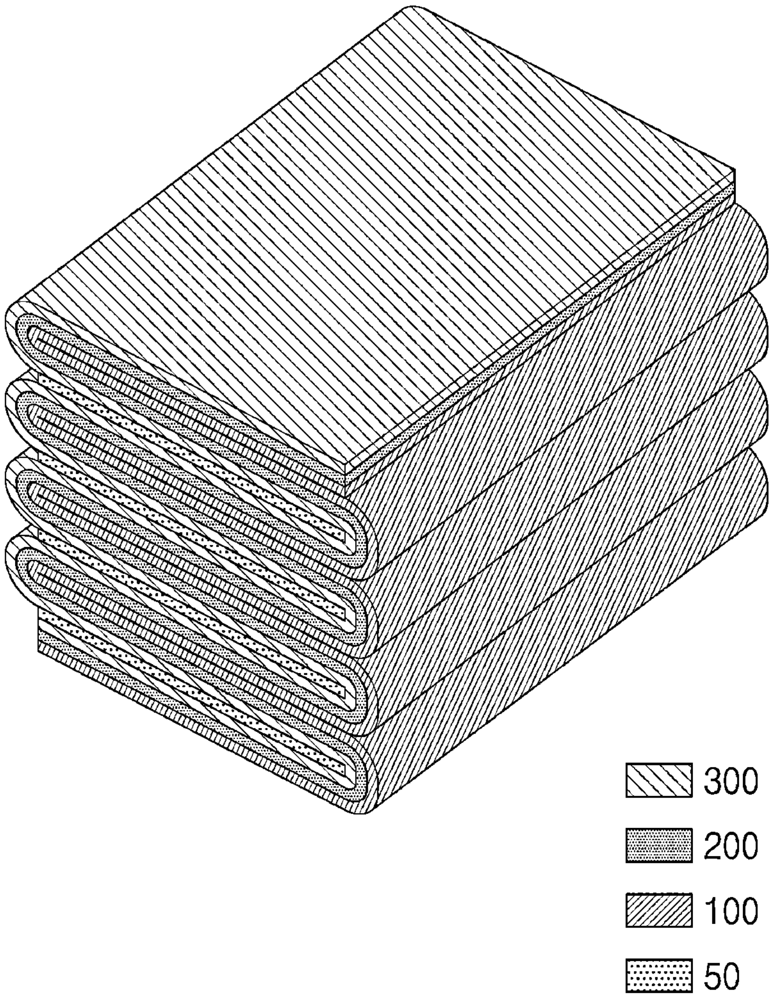
FIGS. 9A and 9B are views for explaining a secondary battery having a bending structure according to a ninth embodiment of the present application.
Figure 9B:
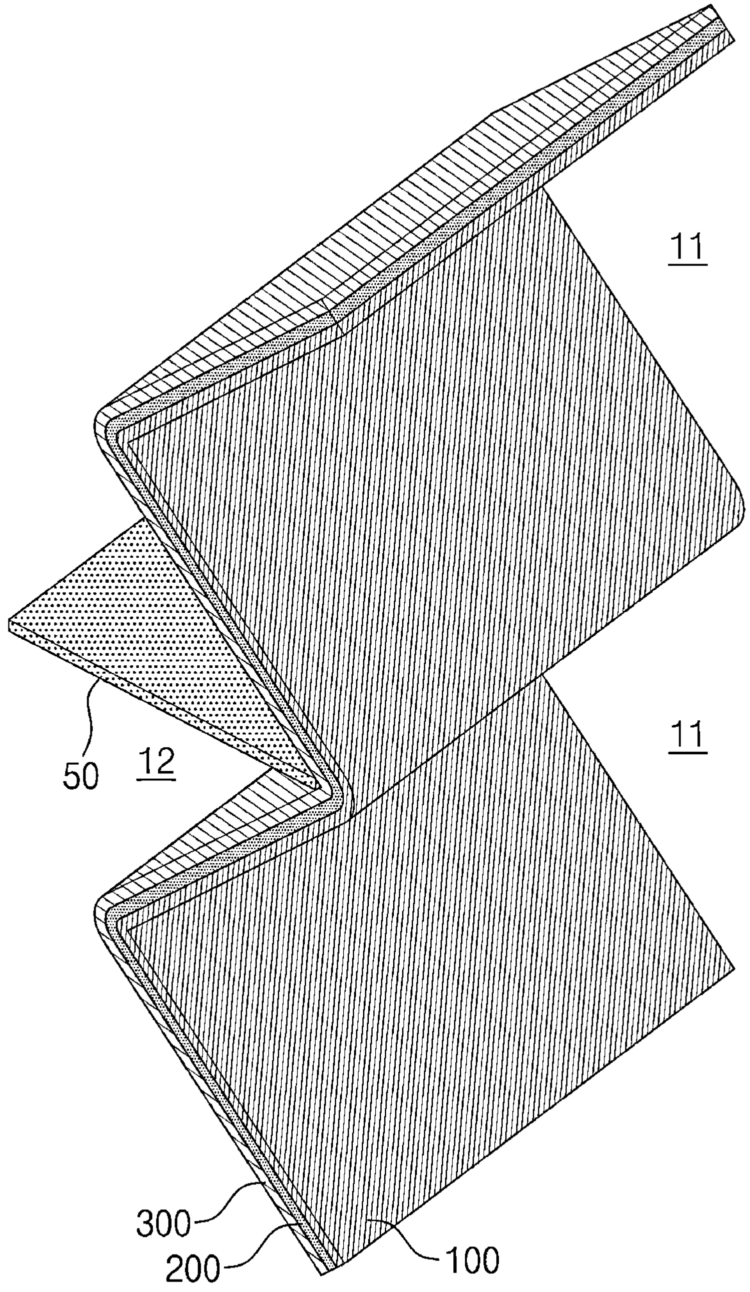

FIGS. 9A and 9B are views for explaining a secondary battery having a bending structure according to a ninth embodiment of the present application.

Referring to FIGS. 9A and 9B, the secondary battery having a bending structure according to a ninth embodiment of the present application may include a positive electrode 300, a solid electrolyte 200, and a negative electrode 100. The secondary battery may further include a gas diffusion layer 50.

The positive electrode 300, the solid electrolyte 200, and the negative electrode 100 may be sequentially stacked together to define a stack structure.

The stack structure may be bent toward a first side and a second side facing the first side as described with reference to FIGS. 5A and 5B. Accordingly, a first bending region 11 in which the stack structure is bent toward the first side may be provided, and a second bending region 12 in which the stack structure is bent toward the second side may be provided.

The negative electrodes 100 of the stack structure may come into contact with each other and folded in the first bending region 11. In other words, nothing may be provided in the first bending region 11, and the negative electrodes 100 may come into contact with each other by being folded as they are.

The gas diffusion layer 50 may be provided in the second bending region 12. As shown in FIG. 9B, the second bending region 12 may be open toward the second side, and the gas diffusion layer 50 may be provided in the open second bending region 12.

The stack structures may be alternately and repeatedly bent toward the first side and the second side to provide the plurality of first bending regions 11 and the plurality of second bending regions 12. The negative electrodes 100 of the stack structure may come into contact with each other in the plurality of first bending regions 11, and the gas diffusion layer 50 may be provided in at least one of the plurality of second bending regions 12.

The positive electrode 300, the solid electrolyte 200, and the negative electrode 100, which are included in the stack structure, may be continuously provided, and the stack structure having the positive electrode 300, the solid electrolyte 200, and the negative electrode 100 stacked together, and the gas diffusion layer 50 provided in the plurality of second bending regions 12 may be defined as a cell structure.

According to an embodiment of the present application, the stack structure having the positive electrode 300, the solid electrolyte 200, and the negative electrode 100 stacked together may be bent toward the first side and the second side, and thus the gas diffusion layer 50 may be inserted into the second bending region 12. Accordingly, the secondary battery may be manufactured by a simple process of bending the stack structure and inserting the gas diffusion layer 50, and the secondary battery may be manufactured by a continuous roll-to-roll process, thereby facilitating mass production.

Figure 10:
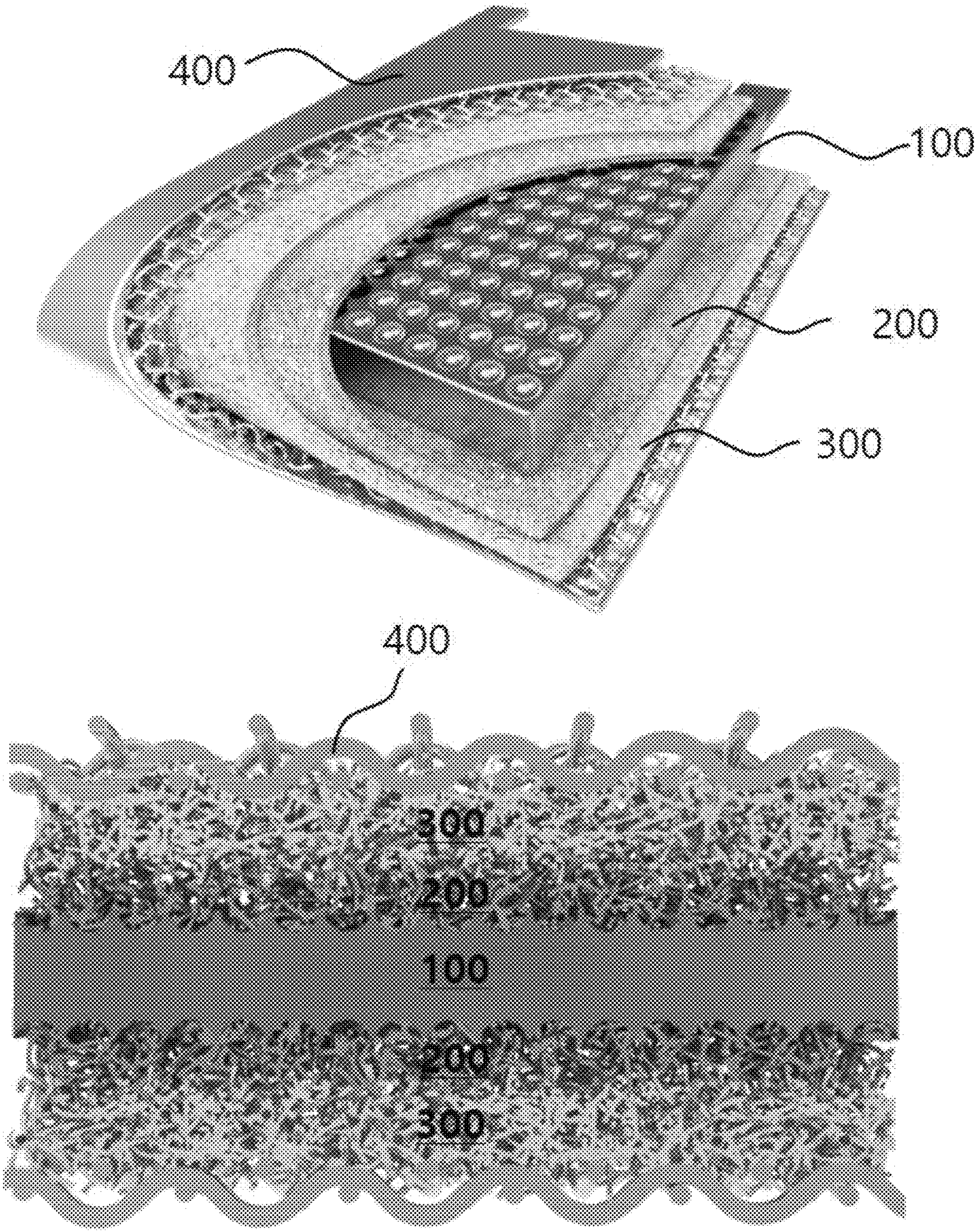
FIG. 10 is a view for explaining a secondary battery according to an embodiment of the present application.

FIG. 10 is a view for explaining a secondary battery according to an embodiment of the present application.

Referring to FIG. 10, as described in the first to ninth embodiments of the present application described above, the secondary battery according to an embodiment of the present application, which includes the positive electrode 300, the solid electrolyte 200, the negative electrode 100, and a current collector 400, may have a bent structure.

Accordingly, the positive electrode 300, the solid electrolyte 200, and the negative electrode 100 may be formed of a highly flexible material and process. Hereinafter, the negative electrode 100, the solid electrolyte 200, and the positive electrode 300 will be described in order.

Figure 11:
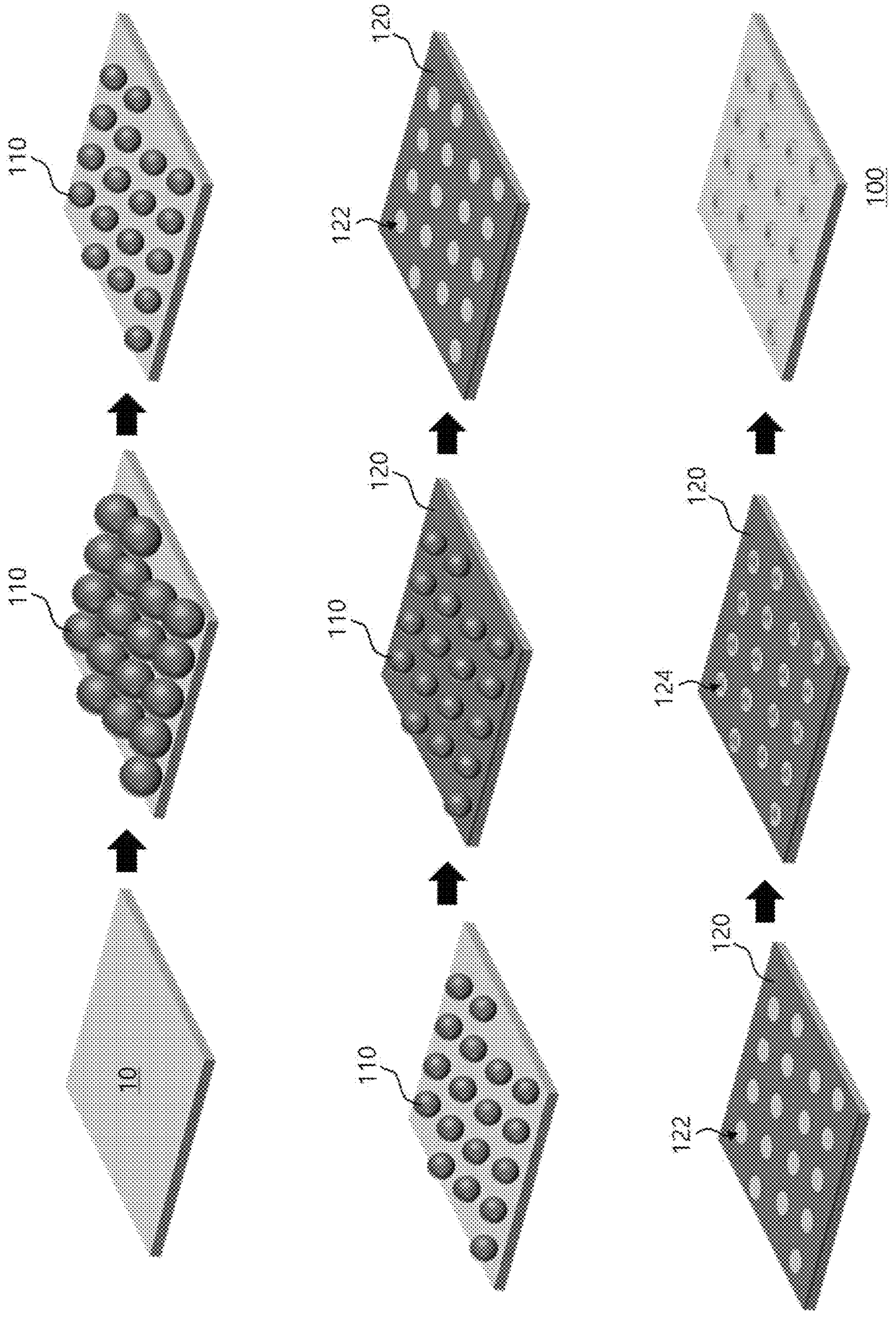
FIG. 11 is a view for explaining a negative electrode included in a secondary battery having a bending structure according to an embodiment of the present application and a method for fabricating the same.

FIG. 11 is a view for explaining a negative electrode included in a secondary battery having a bending structure according to an embodiment of the present application and a method for fabricating the same.

Referring to FIG. 11, a flat base metal substrate 10 may be prepared. The base metal substrate 10 may include a first surface and a second surface facing the first surface, and both the first surface and the second surface may be flat. According to one embodiment, the base metal substrate 10 may include zinc.

A plurality of beads 110 may be disposed on the base metal substrate 10. The plurality of beads 110 may be mixed with a solvent and then spin-coated on the base metal substrate 10. The plurality of beads 110 may be disposed to be spaced apart from each other on the base metal substrate 10. The plurality of beads 110 may be disposed on the first surface of the base metal substrate 10. For example, the plurality of beads 110 may be polystyrene beads.

Before disposing the plurality of beads 110 on the base metal substrate 10, the base metal substrate may be treated with HCl and washed. Accordingly, a native oxide layer on the base metal substrate 10 may be removed.

In addition, before disposing the plurality of beads 110 on the base metal substrate 10, the first surface of the base metal substrate 10 may be treated with hydrophilicity. For example, the first surface of the base metal substrate 10 may have a hydrophilic property by treating the first surface of the base metal substrate 10 with piranha solution. Accordingly, the plurality of beads 110 may be stably and easily provided on the first surface of the base metal substrate 10.

A size of the plurality of beads 110 may be reduced. For example, regions adjacent to the surfaces of the plurality of beads 110 may be removed by applying an oxygen plasma onto the base metal substrate 10 having the plurality of beads 110, and thus the size of the plurality of beads 110 may be reduced. As the size of the plurality of beads 110 is reduced, a distance between the plurality of beads 110 may increase.

A mask layer 120 may be formed on the base metal substrate 10, on which the plurality of beads 110 having a reduced size are disposed. The mask layer 120 may be formed of a polymer using a spin coating process, and thus may cover the base metal substrate 10 exposed between the plurality of beads 110. In addition, the mask layer 120 may not be provided on a bonding surface between the plurality of beads 110 and the base metal substrate 10.

A region to be etched 122 of the base metal substrate 10 which is not covered with the mask layer 120 may be exposed by removing the plurality of beads 110. As described above, the mask layer 120 may not be provided on the bonding surface between the plurality of beads 110 and the base metal substrate 10, and thus the region to be etched 122 (the bonding surface), with which the plurality of beads 110 and the base metal substrate 10 used to come into contact, may be exposed after removing the plurality of beads 110.

After the region to be etched 122 is exposed, a negative electrode 100 may be fabricated by etching the exposed region to be etched 122 of the base metal substrate 10 using the mask layer 120 as a mask.

The region to be etched 122 may be etched by using the mask layer 120 as a mask, so as to provide a plurality of grooves 124 in the negative electrode 100. The plurality of grooves 124 may correspond to the region to be etched 122. The plurality of grooves 124 may not penetrate the negative electrode 100. In other words, the plurality of grooves 124 may have a bottom surface and a side surface, and may have an opened top surface.

The region to be etched 122 may be etched by using an etching gas. According to one embodiment, the etching gas may include fluorine and sulfur. For example, the etching gas may include $SF_6$.

According to one embodiment, a portion of an element included in the etching gas may remain on the bottom surface and/or the side surface of the plurality of grooves 124. Accordingly, the properties of the negative electrode 100 fabricated from the base metal substrate 10 to be described later may be improved. Specifically, an interphase layer may be formed on the surface (the first surface) of the negative electrode 100 in contact with the electrolyte in a process of charging and discharging the secondary battery including the negative electrode 100. In this case, the generation of the interphase layer may be induced by the element included in the etching gas remaining on the bottom surface and/or the side surface of the plurality of grooves 124, and thus the interphase layer may be stably and easily generated to improve the charge/discharge properties and lifespan properties of the secondary battery.

According to one embodiment, a diameter and a depth of the plurality of grooves 124 may be controlled. Specifically, the diameter of the plurality of grooves 124 may be adjusted by a method of controlling the diameter of the plurality of beads 110, and the diameter of the plurality of beads 110 may be controlled by a method of adjusting an initial size of the plurality of beads 110 coated on the base metal substrate 10, a degree of reduction in the size of the plurality of beads 110, etc. A depth of the plurality of grooves 124 may be adjusted according to process conditions (e.g., time, concentration, pressure, power, etc.) for providing the etching gas.

According to one embodiment, a crystal plane developed in the negative electrode 100 may be controlled according to a diameter and a depth of the plurality of grooves 124. Specifically, as the depth of the plurality of grooves 124 increases from 100 nm to 500 nm, (100) crystal plane and (101) crystal plane may be further developed; (002) crystal plane, (102) crystal plane, (103) crystal plane, and (110) crystal plane may be less developed; and (100) crystal plane and (101) crystal plane may be less developed as the depth increases from 500 nm to 5 μm. In addition, as the diameter of the plurality of grooves 124 increases from 100 nm to 500 nm, (100) crystal plane and (101) crystal plane may be further developed; and (100) crystal plane and (101) crystal plane may be less developed as the diameter increases from 500 nm to 1 μm.

Whether or not the crystal plane of the negative electrode 100 is developed may be confirmed through an XRD analysis. As described above, when the diameter and depth of the plurality of grooves 124 increase from 100 nm to 500 nm, a ratio of a peak value corresponding to (101) crystal plane to a peak value corresponding to (002) crystal plane ((101)/(002)) may increase. When the diameter and depth of the plurality of grooves 124 exceed 500 nm, a ratio of a peak value corresponding to (101) crystal plane to a peak value corresponding to (002) crystal plane ((101)/(002)) may decrease.

According to one embodiment, the electrochemical properties of the negative electrode 100 may be controlled according to a ratio of a peak value corresponding to (101) crystal plane to a peak value corresponding to (002) crystal plane ((101)/(002)). Specifically, as the ratio of the peak value corresponding to (101) crystal plane to the peak value corresponding to (002) crystal plane ((101)/(002)) increases, an overpotential value of the secondary battery including the negative electrode 100 may be reduced.

Accordingly, as the ratio of the peak value corresponding to (101) crystal plane to the peak value corresponding to (002) crystal plane ((101)/(002)) increases, the diameter and depth of the plurality of grooves 124 may be controlled, and thus the electrochemical properties of the negative electrode 100 may be improved. For example, the diameter and depth of the plurality of grooves 124 may be 500 nm.

In addition, according to one embodiment, a lattice constant of a unit cell of the negative electrode 100 may be controlled according to the diameter and depth of the plurality of grooves 124. Specifically, when the negative electrode 100 has a hexagonal crystal structure, an a-axis lattice constant of the unit cell of the negative electrode 100 may increase and a c-axis lattice constant thereof may decrease, as the diameter and depth of the plurality of grooves 124 increase.

The negative electrode 100 according to an embodiment of the present application may be fabricated by a method of sequentially forming the plurality of beads 110 and the mask layer 120 on the base metal substrate 10, removing the plurality of beads 110, and etching the base metal substrate 10 by using the mask layer 120 as a mask.

Accordingly, the negative electrode 100 having the plurality of grooves 124 may be fabricated with a high yield by a simple method, and may have high flexibility and mechanical properties due to the plurality of grooves 124.

Figure 12:
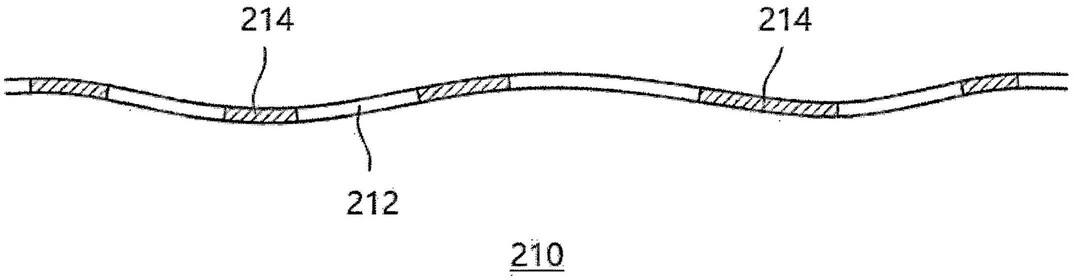
FIG. 12 is a view for explaining a solid electrolyte included in a secondary battery having a bending structure according to an embodiment of the present application and a method for fabricating the same.
Figure 12:
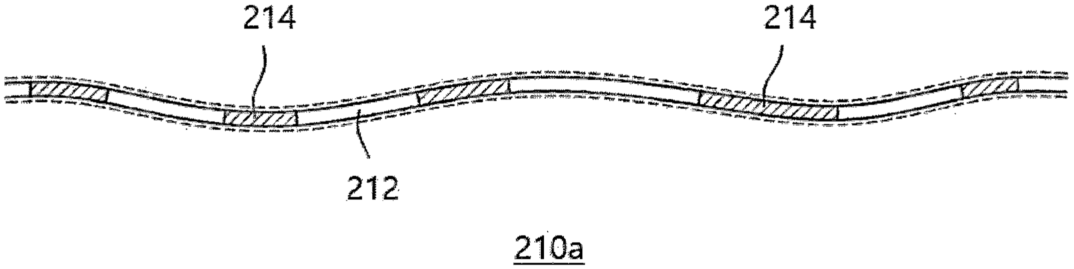
Figure 12:
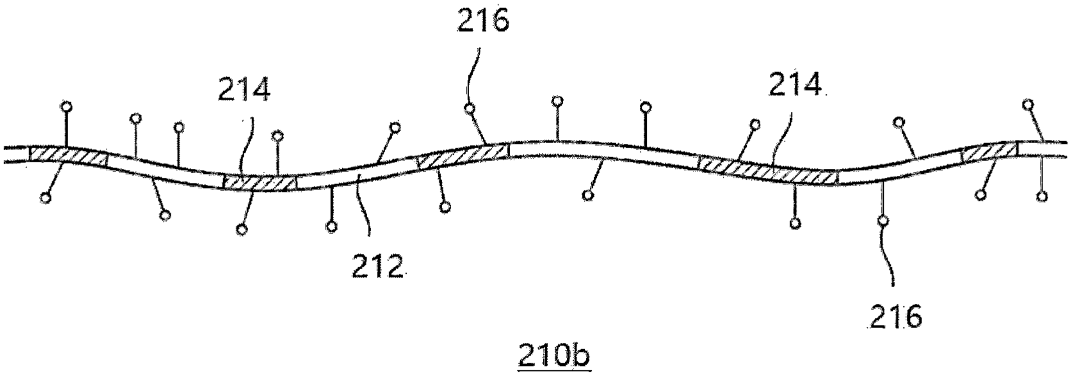

FIG. 12 is a view for explaining a solid electrolyte included in a secondary battery having a bending structure according to an embodiment of the present application and a method for fabricating the same.

Referring to FIG. 12, a chitosan derivative may be prepared.

The chitosan derivative may be obtained by mixing a chitosan precursor in a solvent. According to one embodiment, the chitosan derivative may be obtained by adding a solubilizing agent to chitosan chloride and a solvent. Accordingly, the chitosan chloride may be easily dissolved in a solvent, and the chitosan derivative may be easily provided in a medium to be described later, so that cellulose to which chitosan is bound may be easily prepared.

For example, the solvent may be an aqueous acetic acid, and the solubilizing agent may include at least one of glycidyltrimethylammonium chloride, (2-aminoethyl)trimethylammonium chloride, (2-chloroethyl)trimethylammonium chloride, (3-carboxypropyl)trimethylammonium chloride, or (formylmethyl)trimethylammonium chloride.

The chitosan may have excellent thermal and chemical stability, have high ionic conductivity, and contain OH ions without a long-term loss. In addition, as will be described later, when used in the secondary battery the chitosan may have high compatibility with the negative electrode 100 and the positive electrode 300 compound structure of copper, phosphorus, and sulfur.

Chitosan bound to cellulose may be produced from the chitosan derivative. The step of producing the cellulose to which the chitosan is bound may include: preparing a culture medium having the chitosan derivative; and injecting and culturing a bacterial strain in the culture medium to produce a base complex fiber 110 including a cellulose 212 to which the chitosan 214 is bound. In this case, the cellulose 212 may be bacterial cellulose.

According to one embodiment, the cellulose 212, to which the chitosan 214 is bound, may be prepared by culturing a bacterial pellicle in the culture medium and then desalting the bacterial pellicle. The bacterial pellicle may be prepared by preparing a culture medium containing the chitosan derivative together with raw materials (for example, pineapple juice, peptone, disodium phosphate, citric acid) for culturing yeast and bacteria, and injecting and culturing a strain. For example, the strain may be *Acetobacter xylinum.*

The base complex fiber 210 including the cellulose 212, to which the chitosan 214 is bound, may be prepared by washing and drying the cultured bacterial pellicle, desalting with an acidic solution (for example, HCl), neutralizing and removing a solvent. In the desalting process, the remaining Na, K, or cell shielding materials and debris may be removed, so that the cellulose 212, to which the chitosan 214 of high purity is bound, may be prepared.

In addition, the chitosan 214 may be chemically bound to the cellulose 212. Accordingly, in the cellulose 212 to which the chitosan 214 is bound, a stretching vibration corresponding to C—N may be observed during an XPS analysis.

According to one embodiment, the surface of the cellulose 112 to which the chitosan 214 is bound, that is, the surface of the base complex fiber 210 may be oxidized using an oxidizing agent, so that the first complex fiber 210*a* may be prepared.

Specifically, the step of preparing a first complex fiber 210*a* may include the steps of: adding the base complex fiber 210 to an aqueous solution containing an oxidizing agent to prepare a source solution; adjusting the pH of the source solution to basic; adjusting the pH of the source solution to neutral; and washing and drying a pulp in the source solution to prepare the first complex fiber 210*a*.

For example, the aqueous solution containing the oxidizing agent may be an aqueous TEMPO solution. Alternatively, as another example, the aqueous solution containing the oxidizing agent may include at least one of 4-hydroxy-TEMPO, (diacetoxyiodo)benzene, 4-amino-TEMPO, 4-carboxy-TEMPO, 4-methoxy-TEMPO, TEMPO methacrylate, 4-acetamido-TEMPO, 3-carboxy-PROXYL, 4-maleimido-TEMPO, 4-hydroxy-TEMPO benzoate, or 4-phosphonooxy-TEMPO.

The source solution may further include a sacrificial reagent and an additional oxidizing agent for the oxidation reaction of the base complex fiber 210. For example, the sacrificial reagent may include at least one of NaBr, sodium iodide, sodium bromate, Sodium bromite, Sodium borate, sodium chlorite, or sodium chloride, and the additional oxidizing agent may include at least one of NaClO, potassium hypochlorite, lithium hypochlorite, sodium chlorite, sodium chlorate, perchloric acid, potassium perchlorate, lithium perchlorate, tetrabutylammonium perchlorate, zinc perchlorate, hydrogen peroxide, or sodium peroxide.

According to one embodiment, in the step of adjusting the pH of the source solution to be basic, the pH of the source solution may be adjusted to 10. Accordingly, the oxidation reaction may be easily induced while the precipitate is minimized, and a degree of oxidation of the first complex fiber 210*a* may be improved as compared to the reaction conditions at pH 8 to 9.

According to one embodiment, the additional oxidizing agent may be provided after the base complex fiber 210 and the sacrificial reagent are provided to the aqueous solution containing the oxidizing agent. In addition, the additional oxidizing agent may be provided by dropping. Accordingly, a rapid oxidation phenomenon of the base complex fiber 110 may be prevented, and as a result, the surface of the base complex fiber 210 may be uniformly and stably oxidized.

In addition, according to one embodiment, bromine may be bound to the surface of the cellulose 212 to which the chitosan 214 is bound, and a first functional group 216 containing nitrogen may be substituted with bromine, so that the second complex fiber 210*b* may be prepared.

The first functional group 216 may be represented as in <Formula 1> below, and the first functional group 216 may be bound with the chitosan 214 and/or the cellulose 212.

<Formula 1>

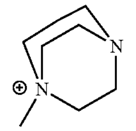

In other words, the second complex fiber 210*b* may have quaternary N.

Specifically, the step of preparing the second complex fiber 210*b* may include: dispersing the base complex fiber 210 in a first solvent and adding a bromine source to prepare a first source solution; adding a coupling agent to the first source solution and reacting to prepare a reaction suspension; filtering, washing and freeze-drying the reaction suspension to prepare a brominated base complex fiber; dispersing the brominated base complex fiber in a second solvent to prepare a second source solution; adding and reacting a precursor of the functional group 216 to the second source solution; filtering, washing, and freeze-drying the reacted solution to prepare the second complex fiber 210*b*.

For example, the first solvent and the second solvent may be the same as each other, and may include at least one of N,N-dimethylacetamide, acetamide, acetonitrile, ethanol, ethylenediamine, diethyl ether, or benzaldehyde.

For example, the bromine source may include at least one of LiBr, sodium bromide, or potassium bromide.

For example, the coupling agent may include N-bromosuccinimide and triphenylphosphine. Bromine can be easily bound to the surface of the base complex fiber 110 by the coupling agent. Specifically, bromine in N-bromosuccinimide may be bound with the base complex fiber 110, and triphenylphosphine may improve a reaction rate by reducing a bromine precursor (bromine source or N-bromosuccinimide).

As described above, after obtaining the brominated base complex fiber from the reaction suspension, the brominated base complex fiber may be freeze-dried. Accordingly, a loss of bromine in the brominated base complex fiber may be minimized, and secondary reaction of bromine with other elements may be minimized.

For example, the precursor of the first functional group 216 may include 1,4-diazabicyclo[2.2.2]octane.

A solid state electrolyte 200 may be prepared by using the cellulose 212 to which the chitosan 214 is bound.

The solid state electrolyte 200 may be prepared in the form of a membrane in which the base complex fiber 210 including the cellulose 212, to which the chitosan 214 is bound, forms a network. For this reason, the solid state electrolyte 200 may be provided with a plurality of pores therein, may have a high surface area, and may be excellent in flexibility and mechanical properties.

The solid state electrolyte 200 may be in a state in which a crystalline phase and an amorphous phase are mixed. More specifically, in the solid state electrolyte 200, the ratio of the amorphous phase may be higher than that of the crystalline phase. Accordingly, the solid state electrolyte 200 may have high ion mobility.

According to one embodiment, the solid state electrolyte 200 may be prepared by a gelatin process using the first complex fiber 210*a* and the second complex fiber 210*b*. In this case, the solid state electrolyte 200 may include the first complex fiber 210*a* and the second complex fiber 210*b*, but the first complex fiber 210*a* and the second complex fiber 110*b* may be cross-linked with each other. Due to the first complex fiber 210*a*, the number of OH ions in the solid state electrolyte 200 may be increased, ionic conductivity may be improved, a negative charge density may be increased, and swelling resistance may be improved. In addition, due to the second complex fiber 210*b*, a molecular weight may be increased to improve thermal stability, and ion exchange capacity may be improved to yield a high moisture impregnation rate and a high swelling resistance, improve cross-linking strength with the first complex fiber 210*a*, and provide a selectively high solubility (ion discerning selectivity) with regard to a specific solvent. Accordingly, the charge/discharge properties and life properties of the secondary battery including the solid state electrolyte 200 may be improved.

Specifically, the step of preparing the solid state electrolyte 200 may include the steps of: mixing the first complex fiber 210*a* and the second complex fiber 210*b* in a solvent to prepare a mixed solution; adding and reacting a crosslinking agent and an initiator to the mixed solution so as to prepare a suspension; casting and drying the suspension on a substrate to prepare a complex fiber membrane; and performing an ion exchange process on the complex fiber membrane.

For example, the solvent may include methylene chloride, 1,2-propanediol, acetone, and a mixed solvent thereof, the crosslinking agent may include glutaraldehyde, and the initiator may include N,N-diethyl-N-methyl-N-(2-methoxyethyl)ammonium bis(trifluoromethanesulfonyl)imide.

In addition, for example, an ion exchange process for the complex fiber membrane may include a step of providing a KOH aqueous solution and a ZnTFSI aqueous solution to the complex fiber membrane. Accordingly, the content of OH ions in the solid state electrolyte 200 may be improved.

As described above, according to an embodiment of the present application, the solid state electrolyte 200 may include the membrane, which has at least one of the base complex fiber 210, the first complex fiber 210*a*, or the second complex fiber 210*b*.

In the solid state electrolyte 200, the ratio of the chitosan 214 may be easily controlled depending on the content of the chitosan derivative provided in the culture medium. Depending on the ratio of the chitosan 214, the crystallinity, ionic conductivity, and swelling ratio of the solid state electrolyte 200 may be controlled. Specifically, as the ratio of the chitosan 214 increases, the crystallinity of the solid state electrolyte 200 may gradually decrease.

According to one embodiment, the content of the chitosan 214 may be more than 30 wt % and less than 70 wt %. If the content of the chitosan 214 is 30 wt % or less, or 70 wt % or more, the ionic conductivity of the solid state electrolyte 200 may be remarkably lowered, and the swelling rate may be remarkably increased.

However, according to an embodiment of the present application, the ratio of the chitosan 214 in the solid state electrolyte 200 may be more than 30 wt % and less than 70 wt %, and thus the solid state electrolyte 200 may have a low swelling ratio value while maintaining high ionic conductivity properties.

Figure 13:
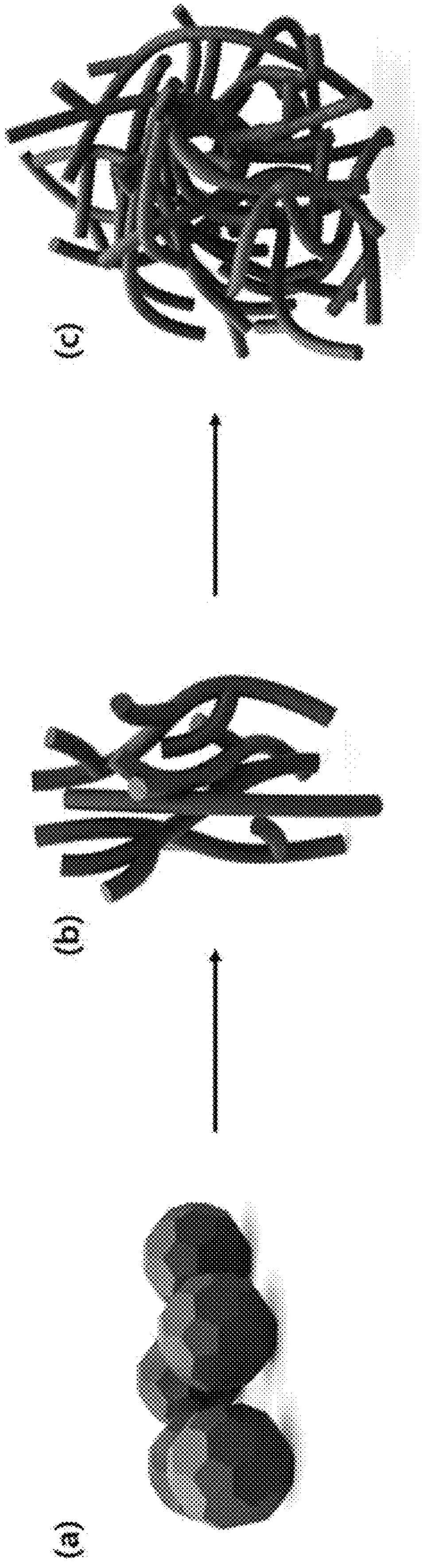
FIG. 13 is a view for explaining a positive electrode included in a secondary battery having a bending structure according to an embodiment of the present application and a method for fabricating the same.

Referring to FIG. 13, a first precursor having a chalcogen element, a second precursor having phosphorus, and a third precursor having a transition metal may be prepared.

According to one embodiment, the chalcogen element may include phosphorus. In this case, for example, the first precursor may include at least any one of dithiooxamide, dithiobiuret, dithiouracil, acetylthiourea, thiourea, N-methylthiourea, bis(phenylthio)methane, 2-imino-4-thiobiuret, N,N' ammonium sulfide, methyl methanesulfonate, sulfur powder, sulphates, N,N-dimethylthioformamide, or davy reagent methyl.

Alternatively, according to another embodiment, the chalcogen element may include at least any one of oxygen, selenium, or tellurium.

For example, the second precursor may include at least any one of tetradecylphosphonic acid, ifosfamide, octadecylphosphonic acid, hexylphosphonic acid, trioctylphosphine, phosphoric acid, triphenylphosphine, ammonium phosphide, pyrophosphates, davy reagent methyl, cyclophosphamide monohydrate, phosphorus trichloride, phosphorus(V) oxychloride, thiophosphoryl chloride, phosphorus pentachloride, or phosphorus pentasulfide.

According to one embodiment, different heterogeneous types including phosphorus may be used as the second precursor. For example, a mixture of tetradecylphosphonic acid and ifosfamide at a ratio of 1:1 (M %) may be used as the second precursor. Accordingly, a stoichiometric ratio of the transition metal, phosphorus, and the chalcogen element may be controlled to 1:1:1. As a result, as will be described later, the positive electrode 300 according to an embodiment of the present application may have a covellite structure, and the electrochemical properties of the positive electrode 300 may be improved.

According to one embodiment, the transition metal may include copper. In this case, for example, the third precursor may include at least any one of copper chloride, copper(II) sulfate, copper(II) nitrate, copper selenide, copper oxychloride, cupric acetate, copper carbonate, copper thiocyanate, copper sulfide, copper hydroxide, copper naphthenate, or copper(II) phosphate.

Alternatively, according to another embodiment, the transition metal may include at least any one of copper, magnesium, manganese, cobalt, iron, nickel, titanium, zinc, aluminum, or tin.

A mixture may be prepared by mixing the first precursor, the second precursor, and the third precursor, and adding a first reducing agent.

The first precursor, the second precursor, and the third precursor may be mixed in solvent and the first reducing agent may be added. For example, the solvent may be a mixture of ethanol and ethylenediamine. Alternatively, for example, the solvent may be a mixture of ethanol and toluene.

According to one embodiment, the direction of the crystal plane of the electrode structure to be described later may be controlled according to the type and mixing ratio of the solvent. In other words, according to the type and mixing ratio of the solvent, whether the crystal plane 101 is developed or not in the positive electrode 300 may be controlled, and thus the electrochemical properties of the positive electrode 300 may be controlled.

According to an embodiment of the present application, in the same way as the (101) crystal plane is developed in the negative electrode 100 to be described later, the solvent may be selected (for example, mixing ethanol and ethylenediamine at a volume ratio of 1:3) so that a crystal plane may be developed in the positive electrode 300, thereby improving the electrochemical properties (for example, ORR, OER, HER) of the positive electrode 300.

After the first precursor, the second precursor, and the third precursor are mixed in the solvent, nucleation and crystallization may proceed as shown in (a) of FIG. 13.

For example, the first reducing agent may include at least any one of ammonium hydroxide, ammonium chloride, or tetramethylammonium hydroxide.

An intermediate product including a plurality of stems may be prepared by co-precipitating the mixture including the first precursor, the second precursor, the third precursor, the first reducing agent, and the solvent.

The mixture may be heat treated to form an intermediate product, as shown in (b) of FIG. 13. The intermediate product may have a plurality of stems, and the plurality of stems may form a network with each other.

For example, the mixture to which the first reducing agent is added may be heat treated under reflux at 120° C., and then washed with deionized water and ethanol.

The first reducing agent may maintain pH and increase a reaction rate while performing a function of the reducing agent during heat treatment. Accordingly, the intermediate product having the plurality of stems may be easily absorbed. For example, when the transition metal is copper and the chalcogen element is sulfur, the intermediate structure may be CuPS having a covellite crystal structure.

A plurality of branches may branch off from the plurality of stems according to a method of adding a second reducing agent to the intermediate product and performing heat treatment under pressure, so as to prepare a plurality of fibrillated fibers including the transition metal, the chalcogen element, and phosphorus.

According to one embodiment, the intermediate product and the second reducing agent may be added to deionized water, and then a pressure heat treatment process may be performed.

For example, the second reducing agent may include at least any one of triton X-165, triton X-102, triton X-45, triton X-114, triton X-405, triton X-101, trimesic acid, diamide, peroxynitrite, formaldehyde, thimerosal, or chloramine-T.

According to one embodiment, a chalcogen element source having the chalcogen element may be further added along with the second reducing agent. Accordingly, the chalcogen element lost in the reaction process may be supplemented by the chalcogen element source, and the electrode structure having a sponge structure in which a plurality of fibrillated fibers to be described later form a network may be easily formed.

For example, when the chalcogen element is sulfur, the chalcogen element source may include at least any one of sodium bisulfite, sodium sulfate, sodium sulfide, sodium thiosulfate, sodium thiomethoxide, sodium ethanethiolate, or sodium methanethiolate.

A process of mixing the intermediate product and the second reducing agent in deionized water may be performed in a cooled state. The reaction rate may be prevented from excessively increasing due to the heat generated in the process of adding the second reducing agent, thereby improving the electrochemical properties of the electrode structure 300 to be described later.

As described above, a plurality of branches may branch off from the plurality of stems as shown in (c) of FIG. 13 by adding a second reducing agent to the intermediate product and performing heat treatment under pressure, and thus the positive electrode 300 having a sponge structure in which a plurality of fibers form a network may be formed.

The positive electrode 300 having a sponge structure may be immersed in liquid nitrogen after being washed with deionized water and ethanol. Accordingly, mechanical properties and flexibility of the electrode structure of the sponge structure may be improved.

In addition, after being immersed in liquid nitrogen, the positive electrode 300 of the sponge structure may be freeze-dried, and the remaining solvents may be removed to minimize a secondary reaction.

The positive electrode 300 may include a membrane of a sponge structure, in which a plurality of branches branch off from the plurality of stems and a plurality of fibers form a network as described above. Accordingly, the electrode structure may have a porous structure in which a plurality of pores having a size of 1 to 2 nm are provided, and may be flexible.

In addition, as described above, the type and ratio of the solvent mixed with the first precursor, the second precursor, and the third precursor may be controlled and thus a crystal plane 101 may be developed in the positive electrode 300. Accordingly, upon the XRD analysis of the positive electrode 300, a peak value corresponding to a crystal plane 101 may have a maximum value compared with a peak value corresponding to another crystal plane. Upon the XRD measurement, a peak value corresponding to a crystal plane 101 may be observed in a range of 2θ values of 19° to 21°.

The plurality of fibers forming the positive electrode 300 may include a compound of the transition metal, phosphorus, and the chalcogen element. For example, when the transition metal is copper and the chalcogen element is oxygen, the fiber may be represented by the following <Formula 1>.

CuPxSy <Formula 1>

When the fiber forming the positive electrode 300 is represented as above <Formula 1>, it may be $x+y=1$, $0.3 \leq x \leq 0.7$, $0.3 \leq y \leq 0.7$.

If, in above <Formula 1>, x is less than 0.3 or more than 0.7 and y is less than 0.3 or more than 0.7, ORR, OER, and HER properties of the positive electrode 300 may be deteriorated, and thus the positive electrode 300 may not react reversibly in a process of charging/discharging of the secondary battery including as a positive electrode 300, accordingly.

However, according to an embodiment of the present application, when the positive electrode 300 is represented by CuPxSy, a composition ratio of P may be 0.3 or more and 0.7 or less and a composition ratio of S may be 0.3 or more and 0.7 or less. Accordingly, the ORR, OER, and HER properties of the positive electrode 300 may be improved, and the charge/discharge property and life property of the secondary battery, which includes the positive electrode 300, may be improved.

When the secondary battery including the positive electrode 300 performs charging and discharging, a lattice spacing of the fibers included in the positive electrode may be reversibly changed. Specifically, when the secondary battery is charged, the lattice spacing may be 0.478 nm, and when the secondary battery is discharged, the lattice spacing may be 0.466 nm. The lattice spacing of the fibers may be confirmed by the HRTEM.

According to an embodiment of the present application, the positive electrode 300 having a membrane shape in which the plurality of fibrillated fibers form a network according to a method of mixing the first precursor having the chalcogen element, the second precursor having phosphorus, and the third precursor having the transition metal.

The positive electrode 300 having high electrochemical properties may be prepared by an inexpensive method.

In addition, the positive electrode 300 may be fabricated by co-precipitation and heat treatment under pressure, and thus may be easily mass-produced and subjected to a simple fabrication process, thereby providing the positive electrode 300 for the secondary battery.

Hereinafter, a specific experimental example of the present application, and results of evaluating properties will be described accordingly.

Fabricating of Negative Electrode According to Experimental Example 1-1

A zinc foil was prepared as a base metal substrate. The zinc foil was sonicated with HCl for five minutes and washed with deionized water and ethanol.

A piranha solution in which $H_2SO_4$, $H_2O$ and $NH_4OH$ are mixed at a ratio of 2.5:7:0.5 (v/v/v), and the zinc foil was treated with piranha solution to improve hydrophilic properties, washed with deionized water, and dried in an argon gas atmosphere.

Polystyrene beads were prepared and spin-coated on the zinc foil, after which oxygen plasma was applied under the conditions of 60 mTorr, 30 sccm flow rate, and 80 W RF, so as to etch the polystyrene beads and reduce a size thereof.

After that, a photosensitive material having chromium was coated on the zinc foil having polystyrene beads to prepare a mask layer, and the polystyrene beads were removed. Then, a plurality of grooves having a depth of 500 nm and a diameter of 500 nm were formed in the zinc foil by providing the etching gas containing argon gas and $SF_6$ gas under the conditions of 0.1 Pa, 40 sccm flow rate, and 60 W RF using the mask film as a mask.

The mask layer was removed, sonicated with diluted $H_2SO_4$, and dried in an argon gas atmosphere, so as to fabricate a negative electrode according to Experimental Example 1-1.

Figure 14:
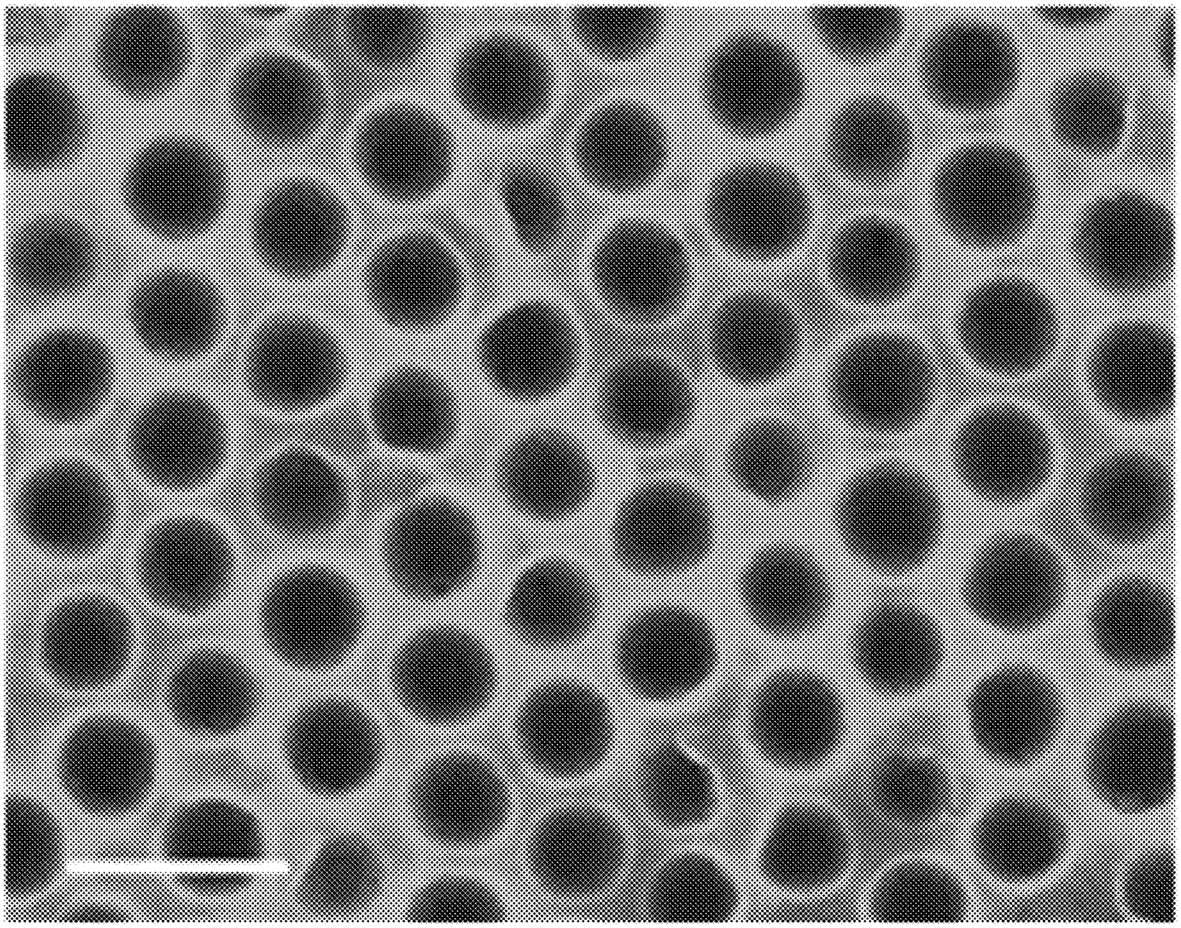
FIG. 14 is an SEM picture of a negative electrode according to Experimental Example 1-1 of the present application.

FIG. 14 is an SEM picture of a negative electrode according to Experimental Example 1-1 of the present application.

Referring to FIG. 14, an SEM picture of the negative electrode according to Experimental Example 1-1 was taken, and it can be confirmed that a plurality of grooves spaced apart from each other are formed in the zinc foil.

Fabricating of Negative Electrode According to Experimental Example 1-2

An unpatterned zinc foil was prepared as a negative electrode according to Experimental Example 1-2.

Preparing of Base Complex Fiber (CBC) According to Experimental Example 2-1

*Acetobacter xylinum* was provided as a bacterial strain, and a chitosan derivative was provided. The chitosan derivative was prepared by dissolving 1 g of chitosan chloride in 1% (v/v) aqueous acetic acid, treating with 1 M glycidyltrimethylammonium chloride at 65° C. for 24 hours in an N2 atmosphere, precipitating, filtering multiple times with ethanol.

A Hestrin-Schramm (HS) culture medium containing pineapple juice (2% w/v), yeast (0.5% w/v), peptone (0.5% w/v), disodium phosphate (0.27% w/v), citric acid (0.015% w/v), and chitosan derivative (2% w/v) was prepared and steam-sterilized at 121° C. for 20 minutes. In addition, *Acetobacter xylinum* was activated in a pre-cultivation Hestrin-Schramm (HS) culture medium at 30° C. for 24 hours, and acetic acid was added to maintain pH 6.

After that, *Acetobacter xylinum* was cultured in the Hestrin-Schramm (HS) culture medium at 30° C. for seven days.

The harvested bacterial pellicle was washed with deionized water to neutralize the pH of the supernatant and dehydrated in vacuum at 105° C. The resulting cellulose was demineralized by using 1 N HCl for 30 minutes (mass ratio 1:15, w/v) to remove an excessive amount of reagent, and then was purified by centrifugation several times with deionized water until the supernatant reached a neutral pH. Finally, all solvents were evaporated at 100° C. to prepare a base complex fiber (chitosan-bacterial cellulose (CBC)).

Preparing of First Complex Fiber (oCBC) According to Experimental Example 2-2

Figure 15:
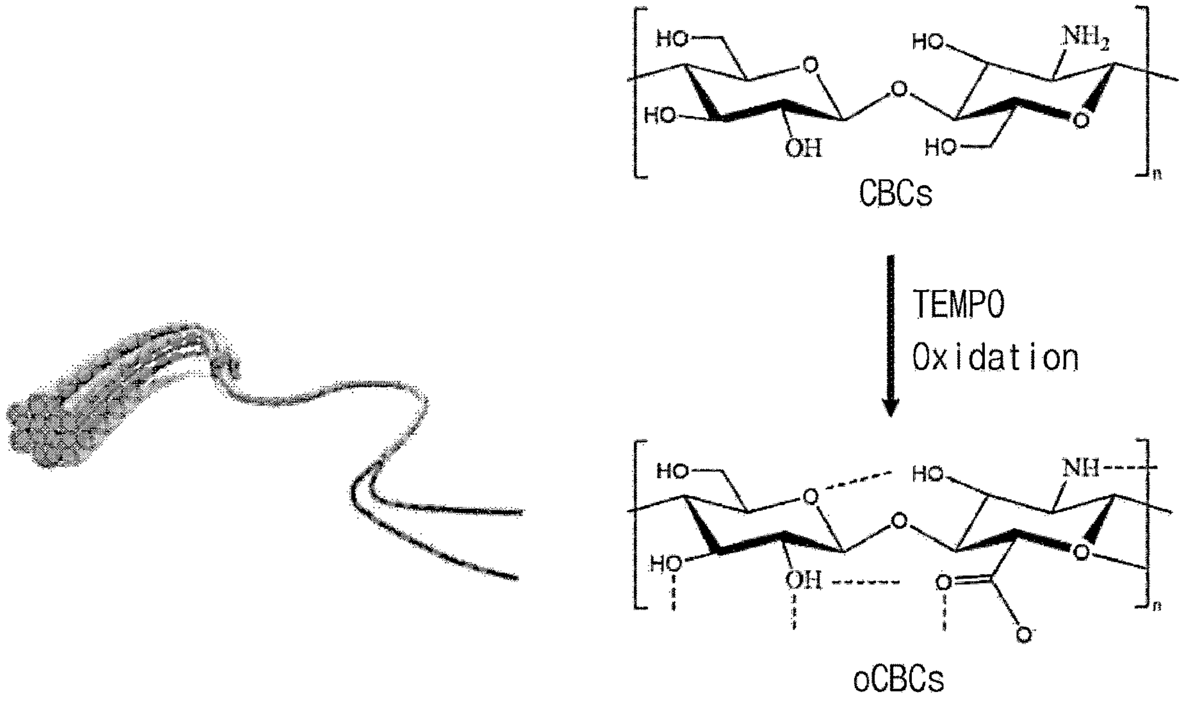
FIG. 15 is a view for explaining a process of preparing a first complex fiber according to Experimental Example 2-2 of the present application.

FIG. 15 is a view for explaining a process of preparing a first complex fiber according to Experimental Example 2-2 of the present application.

A first complex fiber (TEMPO-oxidized CBC (oCBCs)), in which a surface of the base complex fiber is oxidized, was designed according to a method of conjugating a base complex fiber (CBC) of hydroxymethyl and ortho-para directing acetamido to the oxide of TEMPO by an oxidation reaction using 2,2,6,6-tetramethylpiperidine-1-oxyl (TEMPO), sodium bromide (NaBr) and sodium hypochlorite (NaClO) as shown in FIG. 15.

Specifically, 2 g of the base complex fiber dispersed in a 2 mM TEMPO aqueous solution was reacted with NaBr (1.9 mM). 5 mM NaClO was used as an additional oxidizing agent.

The reaction suspension was stirred with ultrasonic waves, and the reaction was allowed to proceed at room temperature for three hours. The pH of the suspension was maintained at 10 by successive addition of 0.5M NaOH solution. Then, 1N HCl was added to the suspension to keep the pH neutral for three hours. The oxidized pulp produced in the suspension was washed three times with 0.5 N HCl, and the supernatant was brought to a neutral pH with deionized water.

The washed pulp was exchanged with acetone and toluene for 30 minutes and dried to evaporate the solvent, and finally a first complex fiber (oCBC) fiber was obtained.

As can be understood from FIG. 15, the surface of the base complex fiber may be oxidized.

Preparing of Second Complex Fiber (qCBC) According to Experimental Example 2-3

Figure 16:
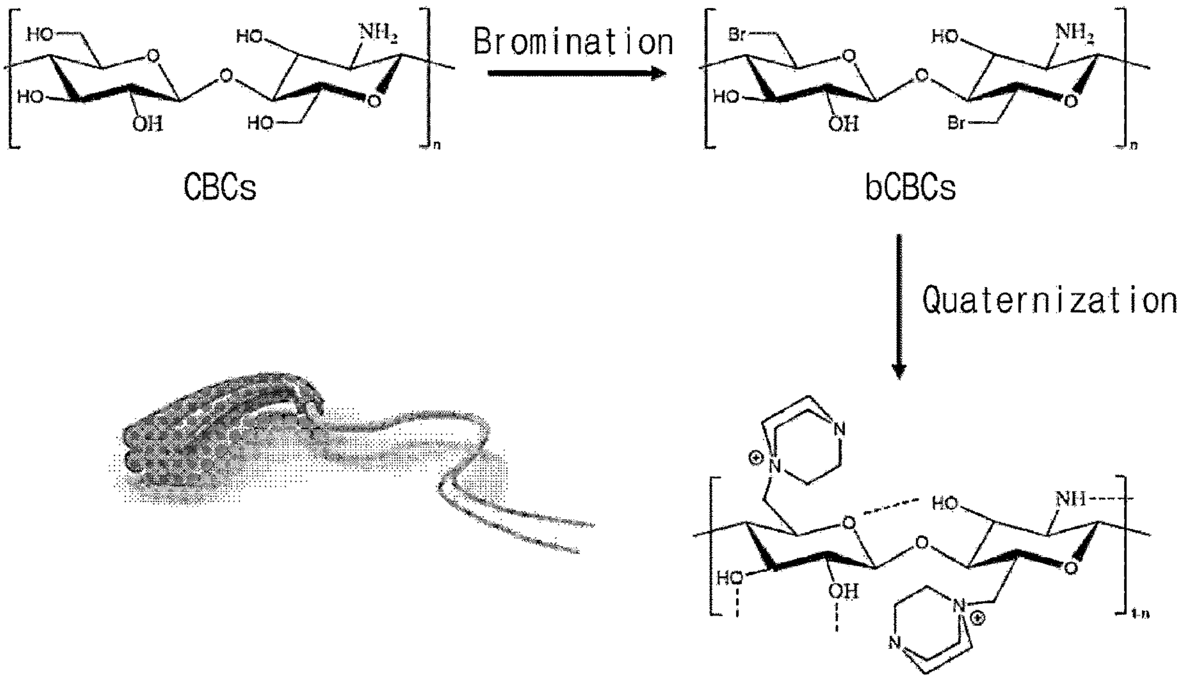
FIG. 16 is a view for explaining a process of preparing a second complex fiber according to Experimental Example 2-3 of the present application.

FIG. 16 is a view for explaining a process of preparing a second complex fiber according to Experimental Example 2-3 of the present application.

A second complex fiber (covalently quaternized CBC (qCBC)), in which a first functional group having nitrogen is bound to the base complex fiber, was prepared according to a method of conjugating a brominated base complex fiber (CBC) and a quaternary amine group by a coupling agent using 1,4-diazabicyclo[2.2.2]octane, as shown in FIG. 16.

Specifically, 1 g of the base complex fiber dispersed in N,N-dimethylacetamide (35 ml) solution was reacted with LiBr (1.25 g) suspension while stirring for 30 minutes. N-bromosuccinimide (2.1 g) and triphenylphosphine (3.2 g) were used as a coupling agent. The two reaction mixtures were stirred for 10 minutes and reacted at 80° C. for 60 minutes.

Then, the reaction suspension was cooled to room temperature, added to deionized water, filtered, rinsed with deionized water and ethanol, and freeze-dried to obtain a brominated base complex fiber (bCBC) fiber.

The brominated base complex fiber was dissolved in 100 ml of N,N-dimethylformamide, and reacted with 1.2 g of 1,4-diazabicyclo[2.2.2]octane.

After that, the mixture was subjected to ultrasonic treatment for 30 minutes, and then reacted at room temperature for 24 hours. The resulting solution was mixed with diethyl ether, washed five times with diethyl ether/ethyl acetate, and freeze-dried to obtain a second complex fiber (covalently quaternized CBC (qCBC)).

As can be understood from FIG. 16, it can be confirmed that the first functional group having nitrogen is bound to the surface of the base complex fiber.

Preparing of Solid State Electrolyte (CBCs) According to Experimental Example 2-4

Figure 17:
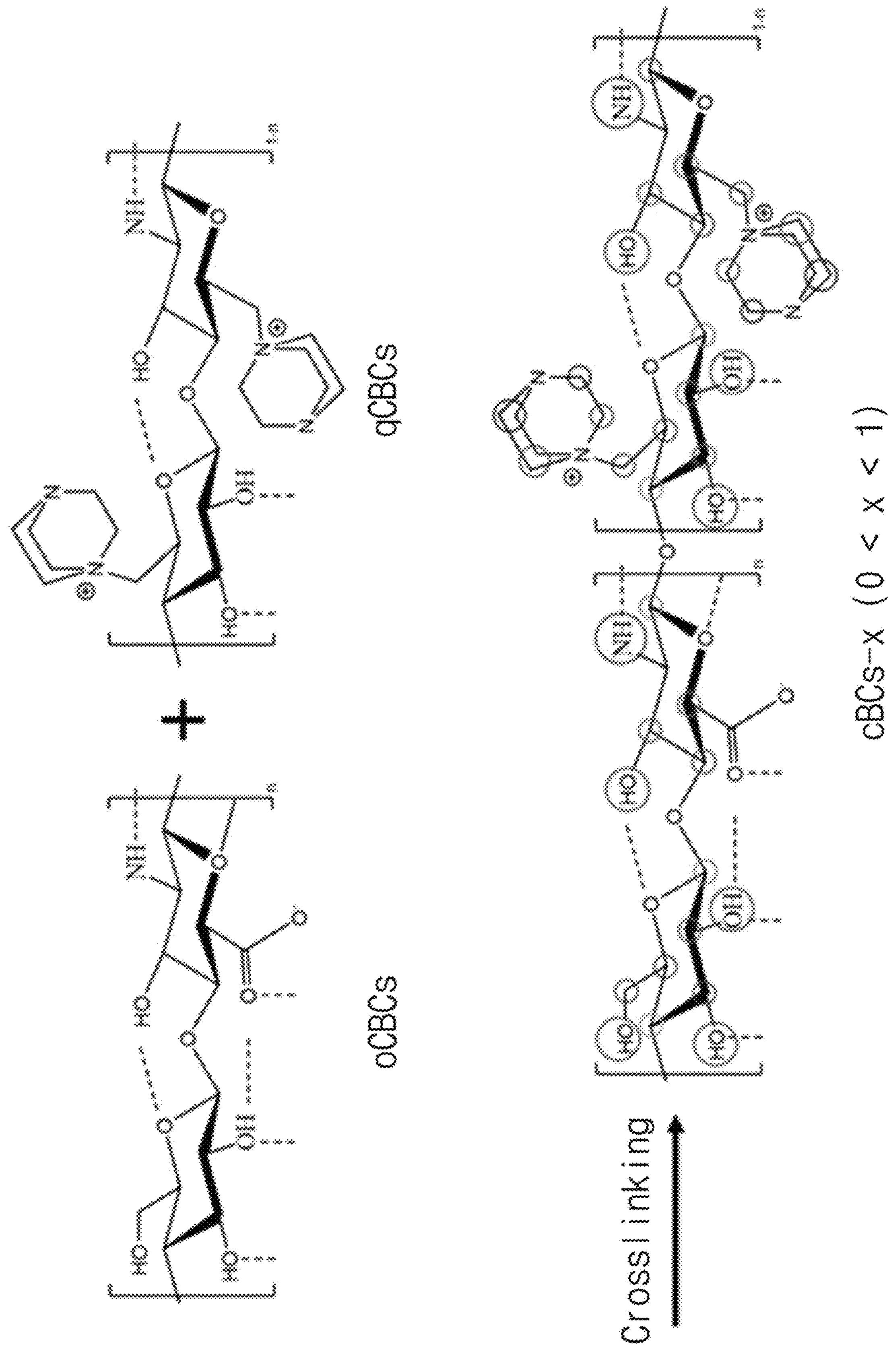
FIG. 17 is a view for explaining a method for fabricating a solid electrolyte according to an experimental example of the present application.

FIG. 17 is a view for explaining a method for fabricating a solid electrolyte according to an experimental example of the present application.

A solid state electrolyte was prepared by a gelatin process using the first complex fiber (oCBC) and the second complex fiber (qCBC), as shown in FIG. 17. Specifically, the first complex fiber (oCBC) and the second complex fiber (qCBC) were dissolved in a mixture of methylene chloride, 1,2-propanediol and acetone (8:1:1 v/v/v %) at the same weight ratio by using ultrasonic waves, and then 1 wt % of glutaraldehyde as a crosslinking agent and 0.3 wt % of N,N-diethyl-N-methyl-N-(2-methoxyethyl)ammonium bis (trifluoromethanesulfonyl)imide as an initiator were added.

Bubbles were removed from the gel suspension by using a vacuum chamber (200 Pa), and casted on a glass at 60° C. for six hours. The complex fiber membrane was peeled off while coagulating with deionized water, rinsed with deionized water, and vacuum dried.

A solid state electrolyte (CBCs) was prepared by an ion exchange with 1 M KOH aqueous solution and 0.1 M ZnTFSI at room temperature for six hours, respectively. After that, washing and immersion processes were performed with deionized water in an N2 atmosphere in order to avoid a reaction with CO2 and a formation of carbonate.

As can be understood from FIG. 17, it can be confirmed that the first complex fibers (oCBC) and the second complex fibers (qCBC) are crosslinked to each other to form the solid state electrolyte (CBCs). OH ions are hopping (grotthuss transport) on the surfaces of the first complex fiber (oCBC) and the second complex fiber (qCBC) crosslinked in the solid state electrolyte (CBCs), and may move through diffusion in the interior spaced apart from the surfaces of the first complex fiber and the second complex fiber. In addition, the solid state electrolyte (CBCs) may have an amorphous phase and thus may have high ionic conductivity compared to a crystalline structure.

In the process of preparing the solid electrolyte (CBCs), a ratio of the first complex fiber (oCBC) and the second complex fiber (qCBC) was adjusted as shown in Table 1 below.

TABLE 1

| Classification | First complex fiber | Second complex fiber |
|---|---|---|
| Experimental Example 2-4 | 10 wt % | 90 wt % |
| Experimental Example 2-5 | 30 wt % | 70 wt % |
| Experimental Example 2-6 | 50 wt % | 50 wt % |
| Experimental Example 2-7 | 70 wt % | 30 wt % |
| Experimental Example 2-8 | 90 wt % | 10 wt % |

Preparing of Solid Electrolytes According to Experimental Examples 2-9 to 2-13

According to Experimental Example 2-1 described above, a base complex fiber was prepared, but base complex fibers having different chitosan contents were prepared by adjusting an addition ratio of the chitosan derivative. After that, according to Experimental Example 2-6 described above, a solid electrolyte according to Experimental Examples 2-9 to 2-13 was prepared by using base complex fibers having different chitosan contents as shown in <Table 2>.

TABLE 2

| Classification | Ratio of chitosan |
|---|---|
| Experimental Example 2-9 | 10 wt % |
| Experimental Example 2-10 | 30 wt % |
| Experimental Example 2-11 | 50 wt % |
| Experimental Example 2-12 | 70 wt % |
| Experimental Example 2-13 | 90 wt % |

Fabrication of Positive Electrode According to Experimental Example 3

Dithiooxamide was prepared as a first precursor having sulfur, a mixture of tetradecylphosphonic acid and ifosfamide (1:1 M %) was prepared as a second precursor having phosphorus, copper chloride was prepared as a third precursor having copper, and a mixture of ethanol and ethylenediamine (1:3 v/v %) was prepared as a solvent.

The first to third precursors were added to the solvent and stirred to prepare a suspension.

After that, 2.5 M % ammonium hydroxide was added as a first reducing agent, stirred for two hours, and heat treated at 120° C. for six hours, after which an intermediate product was obtained, washed with deionized water and ethanol, and dried under vacuum at 50° C.

In an ice bath, the intermediate product was mixed and stirred in 20 ml of deionized water with Triton X-165 as a secondary reducing agent and sodium bisulfite as an elemental sulfur source. After that, heat treatment was performed under pressure at 120° C. for 24 hours to prepare a membrane which is formed of a compound of copper, phosphorus, and sulfur and in which a plurality of fibrillated fibers form a network.

The membrane was washed with deionized water and ethanol to adjust to neutral pH, stored at −70° C. for two hours, immersed in liquid nitrogen, and freeze-dried in vacuum, so as to prepare a CuPS electrode structure according to Experimental Example 1 in which a crystal plane 101 is developed.

In the process of fabricating the electrode structure according to Experimental Example 1, a ratio of the first precursor having sulfur and the second precursor having phosphorus was controlled to adjust a ratio of P and S in CuPS at 0.1:0.9, 0.2:0.8, 03:0.7, 0.5:0.5, 0.7.0.3, and 0.9:0.1, respectively.

Figure 18:
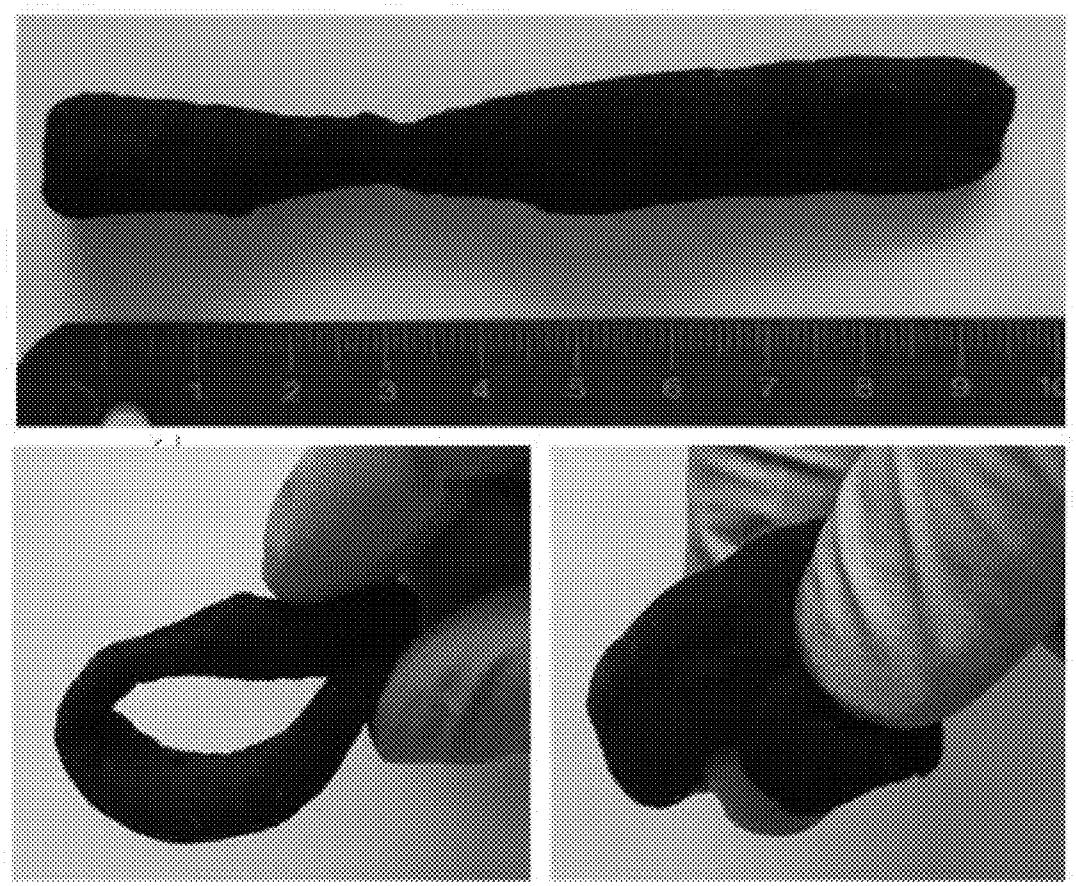
FIG. 18 is a picture of a positive electrode according to Experimental Example 3 of the present application.

FIG. 18 is a picture of a positive electrode according to Experimental Example 3 of the present application.

Referring to FIG. 18, the positive electrode ($CuP_{0.5}S_{0.5}$) prepared according to Experimental Example 3 described above was photographed. It can be confirmed that the positive electrode according to Experimental Example 3 has a length of about 10 cm and is flexible.

Fabrication of Secondary Battery According to Experimental Example 4

A secondary battery (zinc-air battery) according to Experimental Example 4 was fabricated in a pouch type by using a negative electrode having a plurality of grooves with a depth of 500 nm and a diameter of 500 nm according to Experimental Example 1-1, a solid electrolyte according to Experimental Example 2-6, and a CuPS positive electrode having a ratio of P and S of 0.5:0.5 according to Experimental Example 3.

Specifically, the positive electrode (90 wt %) according to Experimental Example 3, super P carbon (5 wt %), and PTFE (5 wt %) were mixed in N-methyl-pyrrolidone containing 0.5 wt % of Nafion solution so as to prepare a slurry. The slurry was coated on a stainless steel mesh and the solvent was evaporated. Then, the resulting product was cut into a size of 6 cm×1.5 and dried in vacuum.

After that, the positive electrode prepared and cut by the method described above and the solid electrolyte of Experimental Example 2-6 were stacked and bent, after which the negative electrode of Experimental Example 1-1 was placed in the bending region, and pressure was applied to prepare a secondary battery (zinc air battery) of Experimental Example 4.

Figure 19:
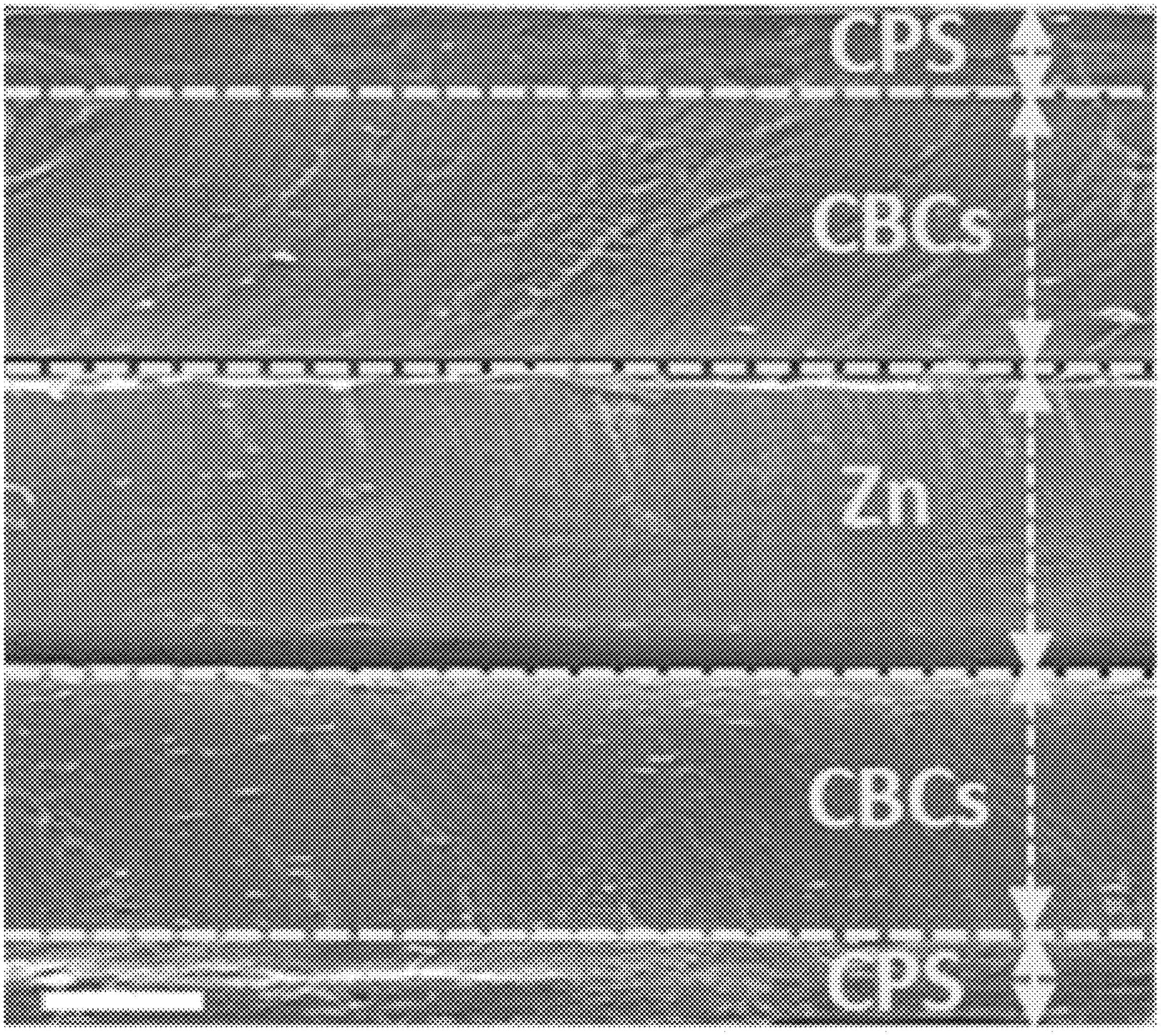
FIG. 19 is an SEM picture of a section of a secondary battery according to Experimental Example 4 of the present application.

FIG. 19 is an SEM picture of a section of a secondary battery according to Experimental Example 4 of the present application.

Referring to FIG. 19, a section of a secondary battery having the negative electrode of Experimental Example 1-1, the solid electrolyte of Experimental Example 2-6, and the CuPS positive electrode of Experimental Example 3 was photographed according to Experimental Example 4 of the present application.

As can be understood from FIG. 19, the negative electrode may be provided in a sandwiched form between the solid electrolyte and the positive electrode, and an interphase between the negative electrode and the solid electrolyte and an interphase between the solid electrolyte and the positive electrode may be confirmed.

Figure 20:
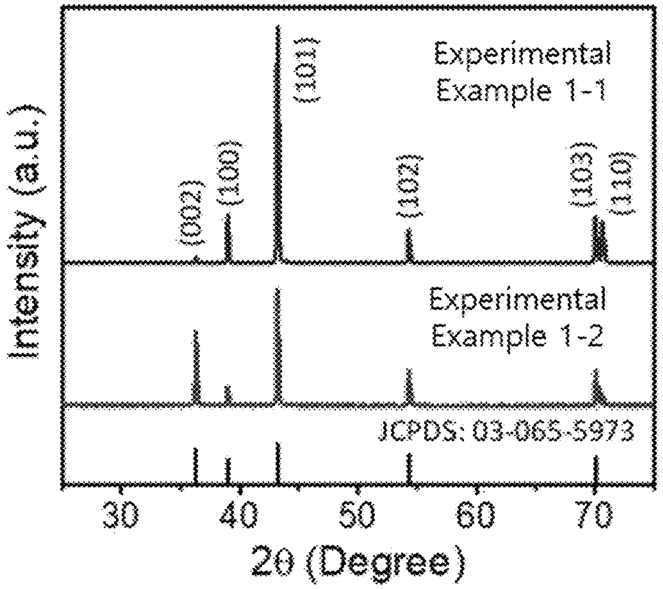
FIG. 20 is a view showing results of an XRD measurement of a negative electrode according to Experimental Examples 1-1 and 1-2 of the present application.

FIG. 20 is a view showing results of an XRD measurement of a negative electrode according to Experimental Examples 1-1 and 1-2 of the present application.

Referring to FIG. 20, an XRD measurement was performed for a negative electrode according to Experimental Examples 1-1 and 1-2.

As can be understood from FIG. 20, when a patterning process is not performed according to Experimental Example 1-2, it can be confirmed that a peak value corresponding to (002) crystal plane is higher than a peak value corresponding to (100) crystal plane. In contrast, when the patterning process is performed according to Example 1-1, it can be confirmed that the peak value for (002) crystal plane decreases and thus the peak value corresponding to (002) crystal plane is lower than the peak value corresponding to (100) crystal plane.

In other words, the fact that the peak value corresponding to (002) crystal plane is lower than the peak value corresponding to (100) crystal plane may refer to a material property caused by the method of fabricating the negative electrode according to the embodiment of the present application.

Figure 21:
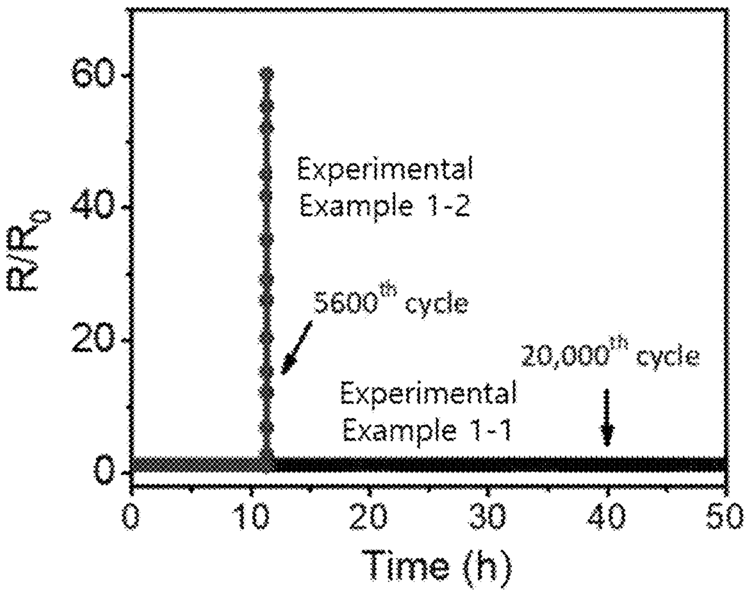
FIG. 21 is a graph showing a measurement of a change in resistance to mechanical deformation of a negative electrode according to Experimental Examples 1-1 and 1-2 of the present application.

FIG. 21 is a graph showing a measurement of a change in resistance to mechanical deformation of a negative electrode according to Experimental Examples 1-1 and 1-2 of the present application.

Referring to FIG. 21, bending was performed 20,000 times while applying pressure to the negative electrode according to Experiment Examples 1-1 and 1-2, and a resistance change according to the number of bending was measured.

As can be understood from FIG. 21, it can be confirmed that the negative electrode of Experimental Example 1-2 without the patterning process has a resistance rapidly increased after bending is performed 5,600 times. In contrast, it can be confirmed that the negative electrode of Experimental Example 1-1 having a plurality of grooves obtained by the patterning process has no substantial change in resistance even after the bending process is performed 20,000 times or more.

In conclusion, it can be confirmed that the negative electrode of Experimental Example 1-1 has excellent mechanical properties and flexibility.

Figure 22:
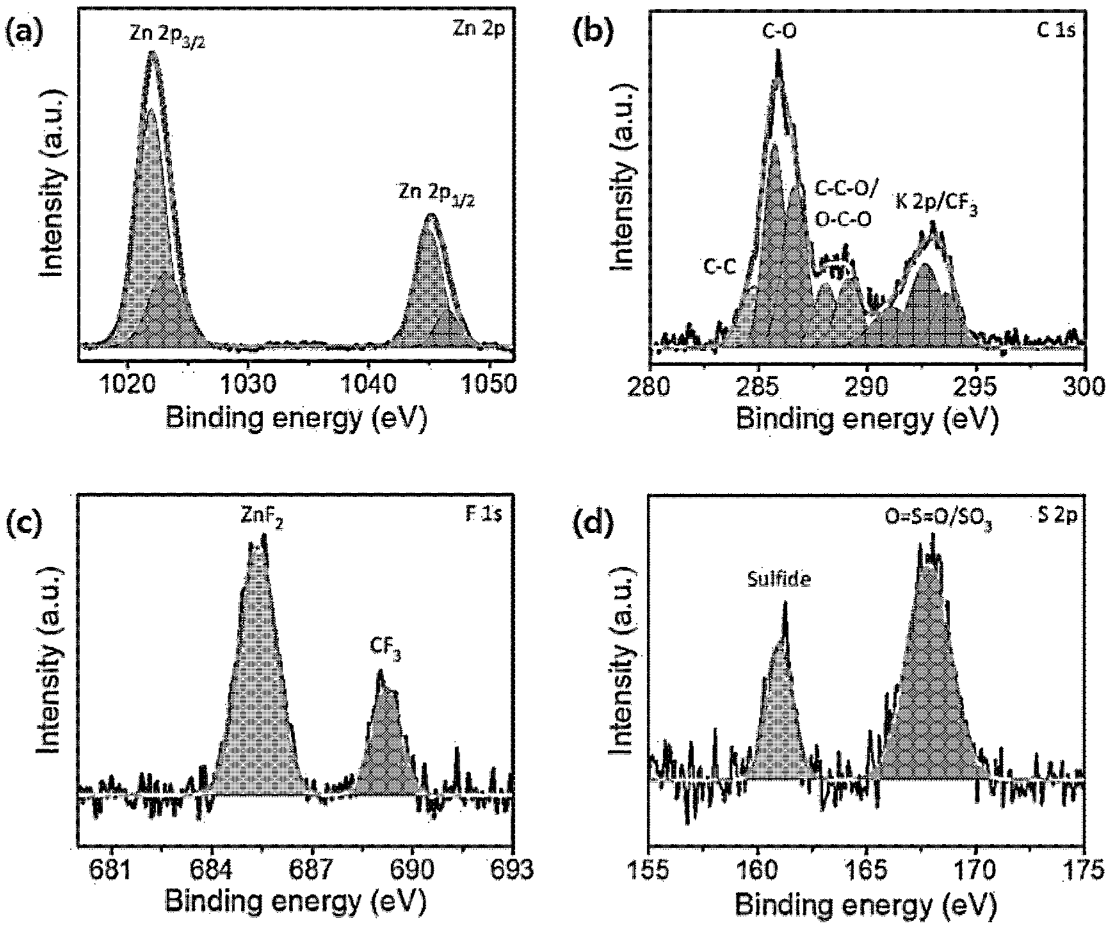
FIG. 22 is a view showing results of an XPS analysis on an interphase layer of a negative electrode after 100 times of charging and discharging of a secondary battery including a negative electrode according to Experimental Example 1-1 of the present application.
Figure 23:
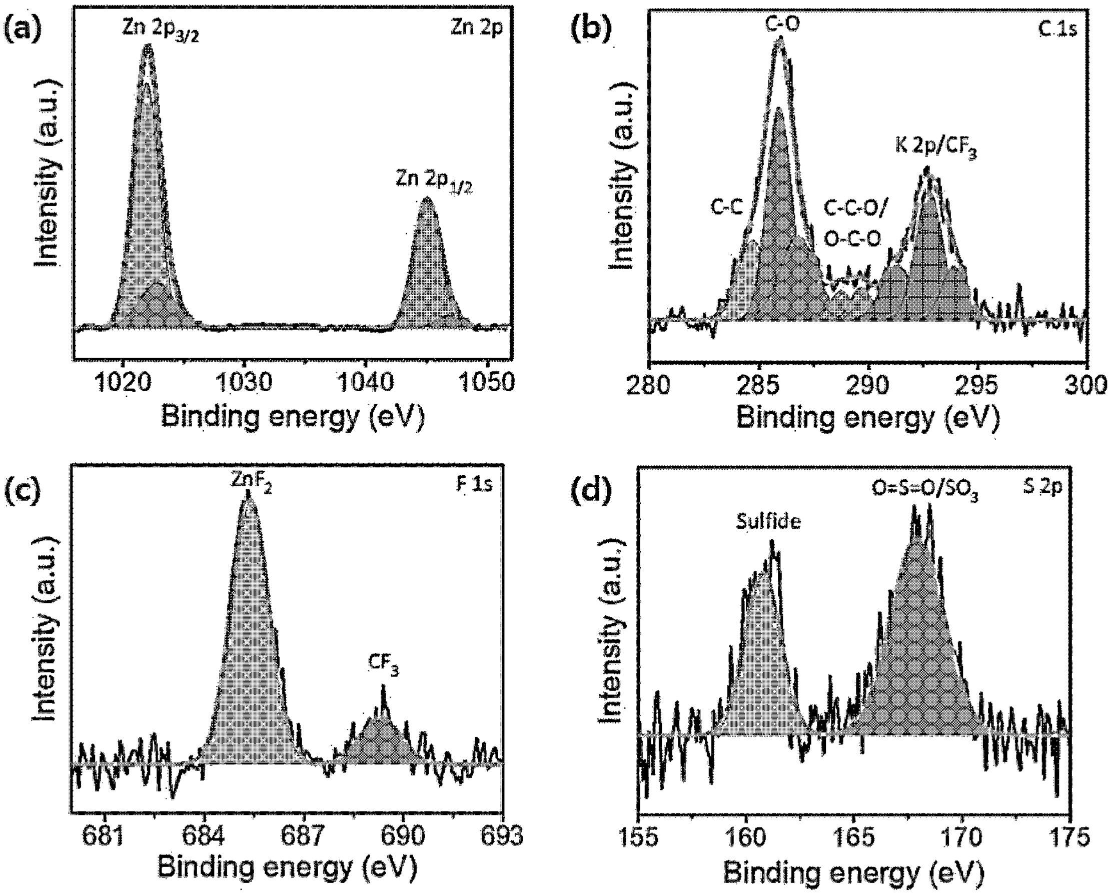
FIG. 23 is a view showing results of an XPS analysis on an interphase layer of a negative electrode after 6,000 times of charging and discharging of a secondary battery including a negative electrode according to Experimental Example 1-1 of the present application.

FIG. 22 is a view showing results of an XPS analysis on an interphase layer of a negative electrode after 100 times of charging and discharging of a secondary battery including a negative electrode according to Experimental Example 1-1 of the present application, and FIG. 23 is a view showing results of an XPS analysis on an interphase layer of a negative electrode after 6,000 times of charging and discharging of a secondary battery including a negative electrode according to Experimental Example 1-1 of the present application.

Referring to FIGS. 22 and 23, an XPS analysis was performed for an interphase layer formed on a surface of the negative electrode after 100 and 6,000 times of charging and discharging of a secondary battery of Experimental Example 4 including a negative electrode of Experimental Example 1-1.

As can be understood from FIGS. 22 and 23, it can be confirmed that an interphase layer formed on the surface of the negative electrode includes Zn, C, S, and F, and has Zn—O, C═O, and C—O vibrations.

It can be confirmed that bonds such as Zn—F and Zn—S present in the interphase layer are present in an amount of less than 5 at %, but perform an important function of stabilizing a surface of a zinc electrode, and the elastic properties of the solid electrolyte according to an embodiment of the present application having bacterial cellulose stabilize an interphase layer on the surface of the negative electrode together with the bonds of Zn—F and Zn—S.

In addition, it can be seen that a ratio of Zn—F to Zn—S(ZnF/ZnS) increases as a charge/discharge cycle is performed, and also increases up to about 8.6 at % after 6,000 times of charge/discharge cycles. This may be material and electrochemical properties caused by a combination of the solid electrolyte and the negative electrode according to an embodiment of the present application.

Figure 24:
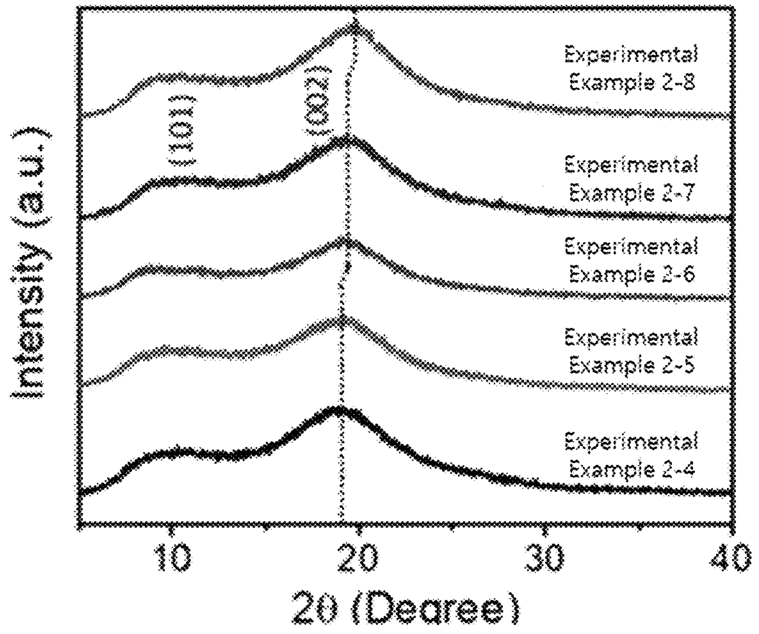
FIG. 24 is a view showing results of an XRD analysis on a solid electrolyte according to Experimental Examples 2-4 to 2-8 of the present application.

FIG. 24 is a view showing results of an XRD analysis on a solid state electrolyte according to Experimental Examples 2-4 to 2-8 of the present invention.

Referring to FIG. 24, an XRD analysis was performed on the solid state electrolytes according to Experimental Examples 2-4 to 2-8 as described above.

As can be understood from FIG. 24, it can be confirmed that the solid state electrolytes according to Experimental Examples 2-4 to 2-8 have peak values corresponding to (101) and (002) crystal planes, and the crystal structure does not substantially change depending on the ratio of the first complex fiber (oCBC) and the second complex fiber (qCBC), but the 2θ value of the peak value corresponding to (002) crystal plane slightly increases as the ratio of the second complex fiber increases.

Figure 25:
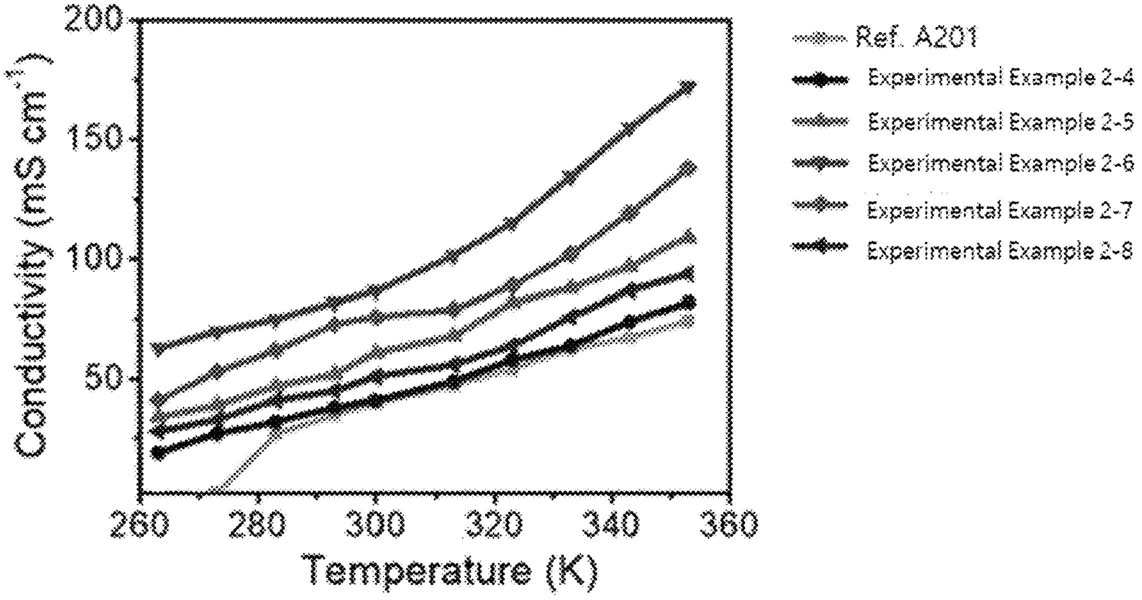
FIG. 25 is a view showing results of measuring ion conductivity depending on a temperature of a solid electrolyte according to Experimental Examples 2-4 to 2-8 of the present application.

FIG. 25 is a view showing results of measuring ionic conductivity depending on a temperature for a solid state electrolyte according to Experimental Examples 2-4 to 2-8 of the present invention.

Referring to FIG. 25, the ionic conductivity of the solid state electrolytes according to Experimental Examples 2-4 to 2-8 as described above was measured according to temperatures, and the ionic conductivity of the commercially available A201 membrane was measured according to temperatures.

As can be understood from FIG. 25, the ionic conductivity of the solid state electrolyte according to Experimental Examples 2-4 to 2-8 and the A201 membrane increased as the temperature increased. In addition, it can be confirmed that the ionic conductivity of the solid state electrolytes according to Experimental Examples 2-4 to 2-8 is remarkably higher than that of the A201 membrane.

In addition, it can be confirmed that the solid state electrolyte with the same ratio of the first complex fiber and the second complex fiber according to Experimental Example 2-6 has ionic conductivity higher than that of the solid state electrolytes according to Experimental Examples 2-4, 2-5, 2-7, and 2-8. As a result, it can be confirmed that controlling the ratio of the first complex fiber to more than 30 wt % and less than 70 wt %, and controlling the ratio of the second complex fiber to less than 70 wt % and more than 30 wt % is an efficient way to improve the ionic conductivity of OH ions.

Figure 26:
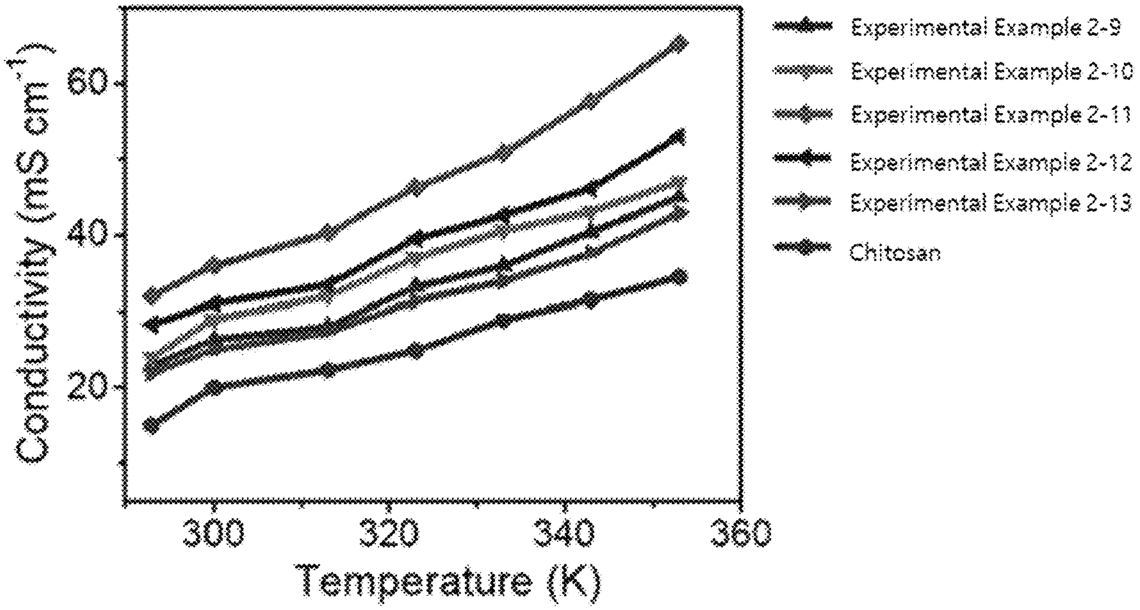
FIG. 26 is a view showing results of measuring ion conductivity depending on a temperature of chitosan and a solid electrolyte according to Experimental Examples 2-9 to 2-13 of the present application.

FIG. 26 is a view showing results of measuring ion conductivity depending on a temperature of chitosan and a solid electrolyte according to Experimental Examples 2-9 to 2-13 of the present application.

Referring to FIG. 26, ion conductivity for chitosan and a solid electrolyte according to Experimental Examples 2-9 to 2-13 was measured according to a temperature.

As can be understood from FIG. 26, it was found that the ion conductivity of chitosan and the solid electrolyte according to Experimental Examples 2-9 to 2-13 increases as a temperature increases. In addition, it can be confirmed that the ion conductivity of the solid electrolytes according to Experimental Examples 2-9 to 2-13 is remarkably higher than that of chitosan.

In addition, it can be confirmed that the solid electrolyte with 50 wt % of chitosan according to Experimental Example 2-11 has ion conductivity remarkably higher than that of a solid electrolytes according to Experimental Examples 2-9, 2-10, 2-12, and 2-13. As a result, it can be confirmed that controlling the ratio of chitosan to more than 30 wt % and less than 70 wt % in the solid electrolyte is an efficient way to improve the ion conductivity of OH ions.

Figure 27:
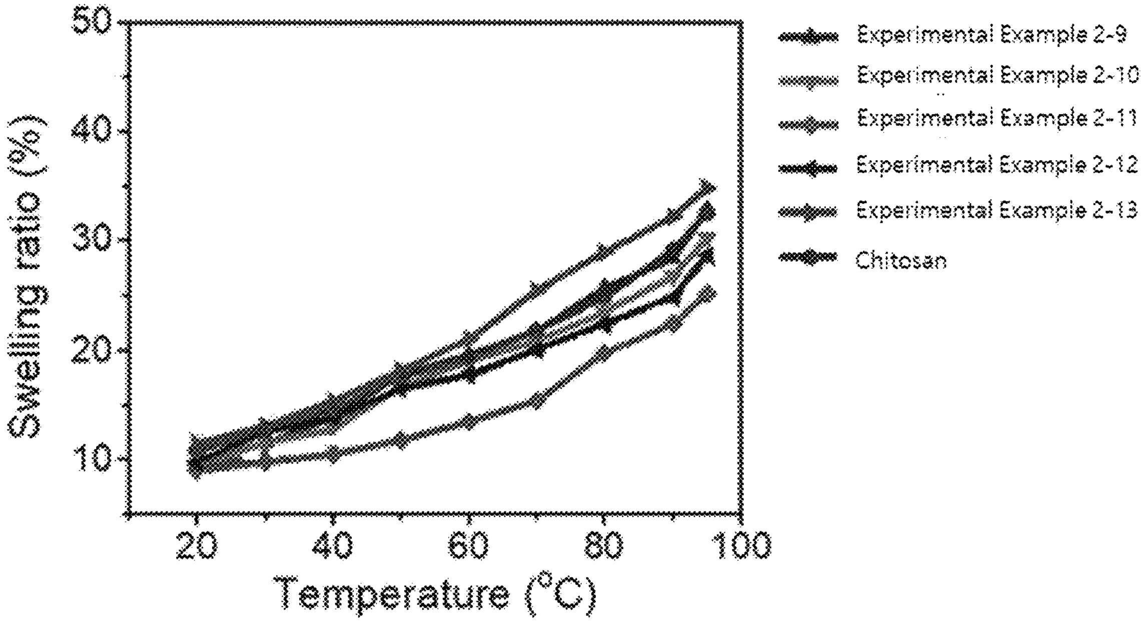
FIG. 27 is a view showing results of measuring a swelling ratio depending on a temperature of chitosan and a solid electrolyte according to Experimental Examples 2-9 to 2-13 of the present application.

FIG. 27 is a view showing results of measuring a swelling ratio depending on a temperature of chitosan and a solid electrolyte according to Experimental Examples 2-9 to 2-13 of the present application.

Referring to FIG. 27, a swelling ratio for chitosan and a solid electrolyte according to Experimental Examples 2-9 to 2-13 was measured according to a temperature.

As can be understood from FIG. 27, it was found that the swelling ratio of chitosan and the solid electrolyte according to Experimental Examples 2-9 to 2-13 increases as a temperature increases. In addition, it can be confirmed that the solid electrolyte with 50 wt % of chitosan according to Experimental Example 2-11 has a swelling ratio remarkably lower than that of solid electrolytes according to Experimental Examples 2-9, 2-10, 2-12, and 2-13. As a result, it can be confirmed that controlling the ratio of chitosan to more than 30 wt % and less than 70 wt % in the solid electrolyte is an efficient way to improve the swelling ratio.

Figure 28:
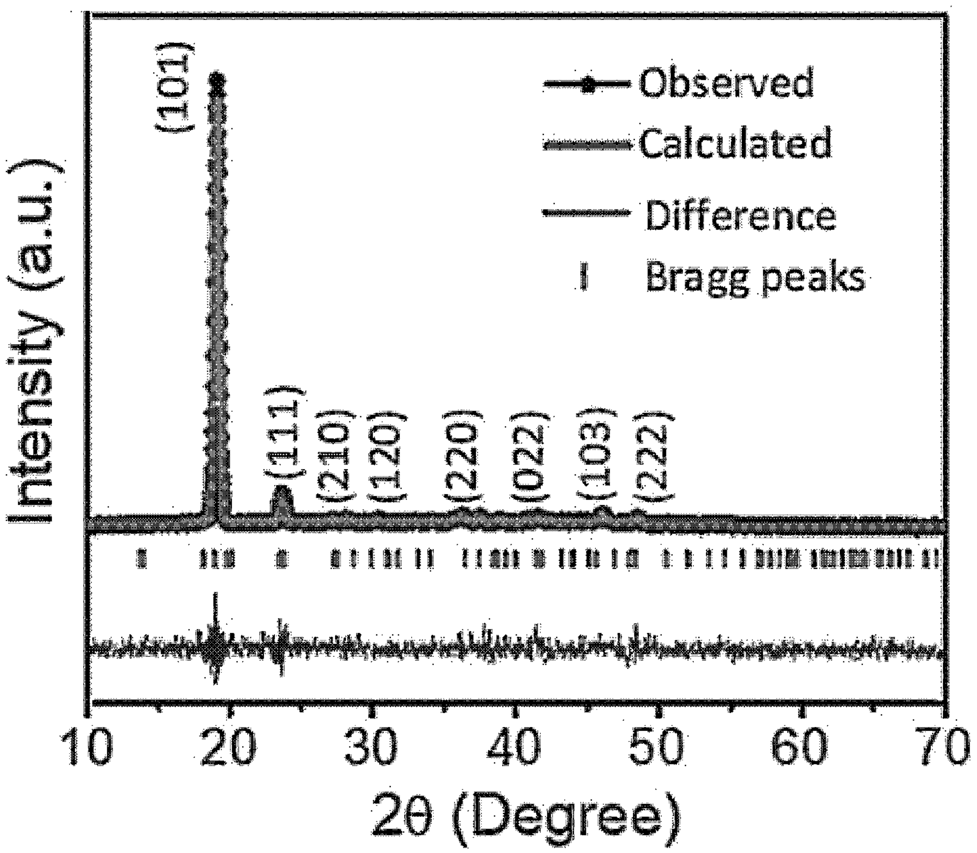
FIG. 28 is an XRD graph of a positive electrode fabricated according to Experimental Example 3 of the present application.

FIG. 28 is an XRD graph of a positive electrode fabricated according to Experimental Example 3 of the present application.

Referring to FIG. 28, an XRD measurement was performed for a positive electrode fabricated according to Experimental Example 3.

As can be understood from FIG. 28, it can be confirmed that the positive electrode of Experimental Example 3 has (101) crystal plane, (111) crystal plane, (210) crystal plane, (120) crystal plane, (220) crystal plane, (022) crystal plane, (103) crystal plane, and (222) crystal plane, and in particular, a peak corresponding to (101) crystal plane has a size remarkably higher than those of peaks corresponding to crystal planes other than (101) crystal plane. In addition, it can be seen that the positive electrode of Experimental Example 3 has a covellite phase with an orthorhombic crystal structure Pnm21 space group.

Figure 29:
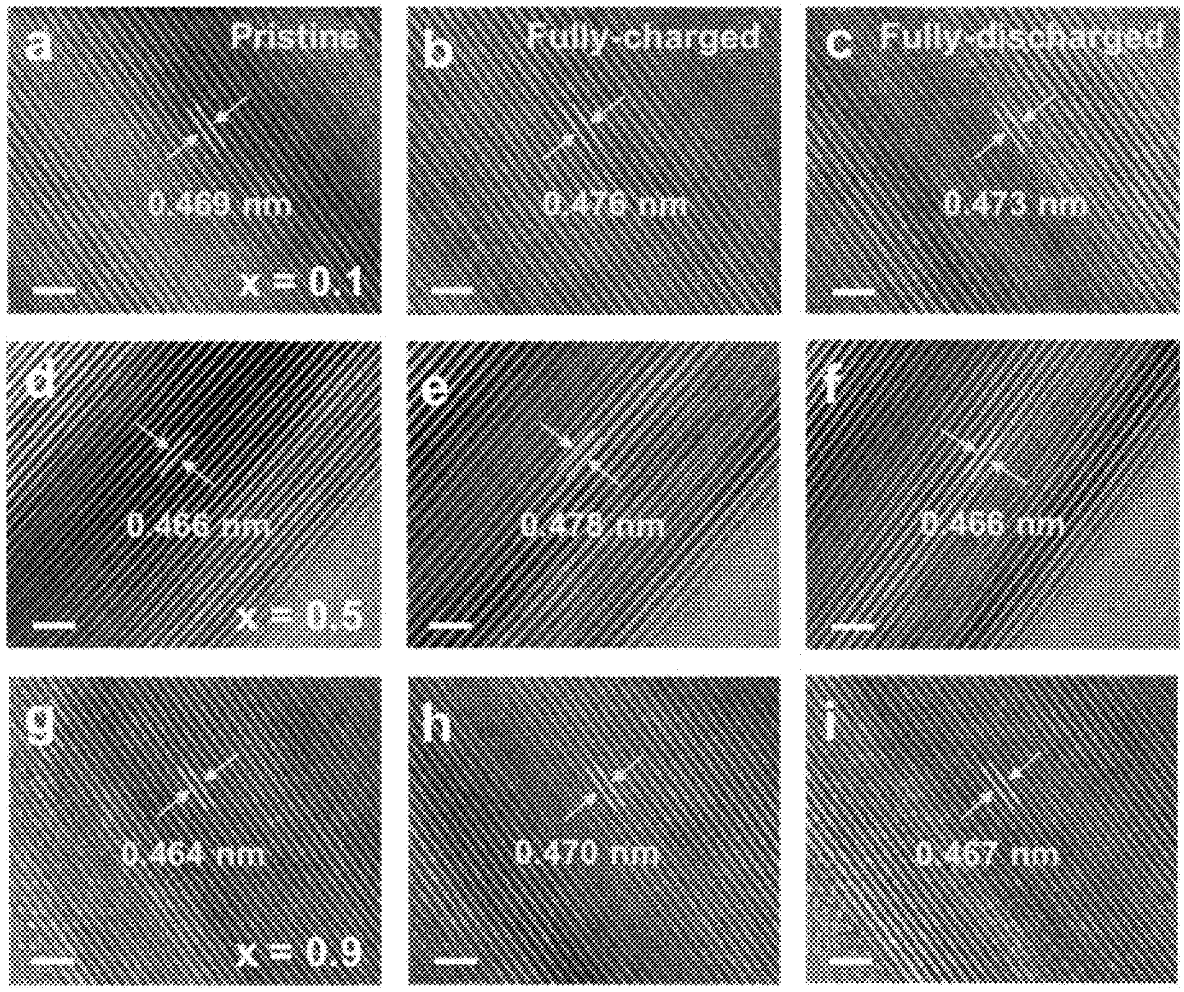
FIG. 29 is an HRTEM picture of a positive electrode according to Experimental Example 3 in a charged/discharged state of a secondary battery according to Experimental Example 4 of the present application.

FIG. 29 is an HRTEM picture of a positive electrode according to Experimental Example 3 in a charged/discharged state of a secondary battery according to Experimental Example 4 of the present application.

Referring to FIG. 29, an HRTEM picture of a positive electrode according to Experimental Example 3 was taken in a charged/discharged state of a secondary battery according to Experimental Example 4. $CuP_{0.1}S_{0.9}$, $CuP_{0.5}S_{0.5}$, and $CuP_{0.9}S_{0.1}$ were used for the positive electrode according to Experimental Example 1. a, b and c of FIG. 29 show an HRTEM picture of $CuP_{0.1}S_{0.9}$, d, e and f of FIG. 29 show an HRTEM picture of $CuP_{0.5}S_{0.5}$, and g, h and i of FIG. 29 show an HRTEM picture of $CuP_{0.9}S_{0.1}$.

As can be understood from FIG. 29, in the case of $CuP_{0.1}S_{0.9}$ and $CuP_{0.9}S_{0.1}$, a redox band of Cu may be positioned to be higher than an S 3p band, and thus the oxidized sulfur may be unstable. Accordingly, as shown in FIG. 29, it can be confirmed that the lattice spacing is not reversibly recovered even when charging and discharging are performed. In contrast, in the case of $CuP_{0.5}S_{0.5}$, it can be confirmed that the lattice spacing before charging is 0.466 nm, the lattice spacing after charging is 0.478 nm, and the lattice spacing after discharging is 0.466 nm, thus suggesting that the lattice spacing is reversibly recovered after charging and discharging.

Figure 30:
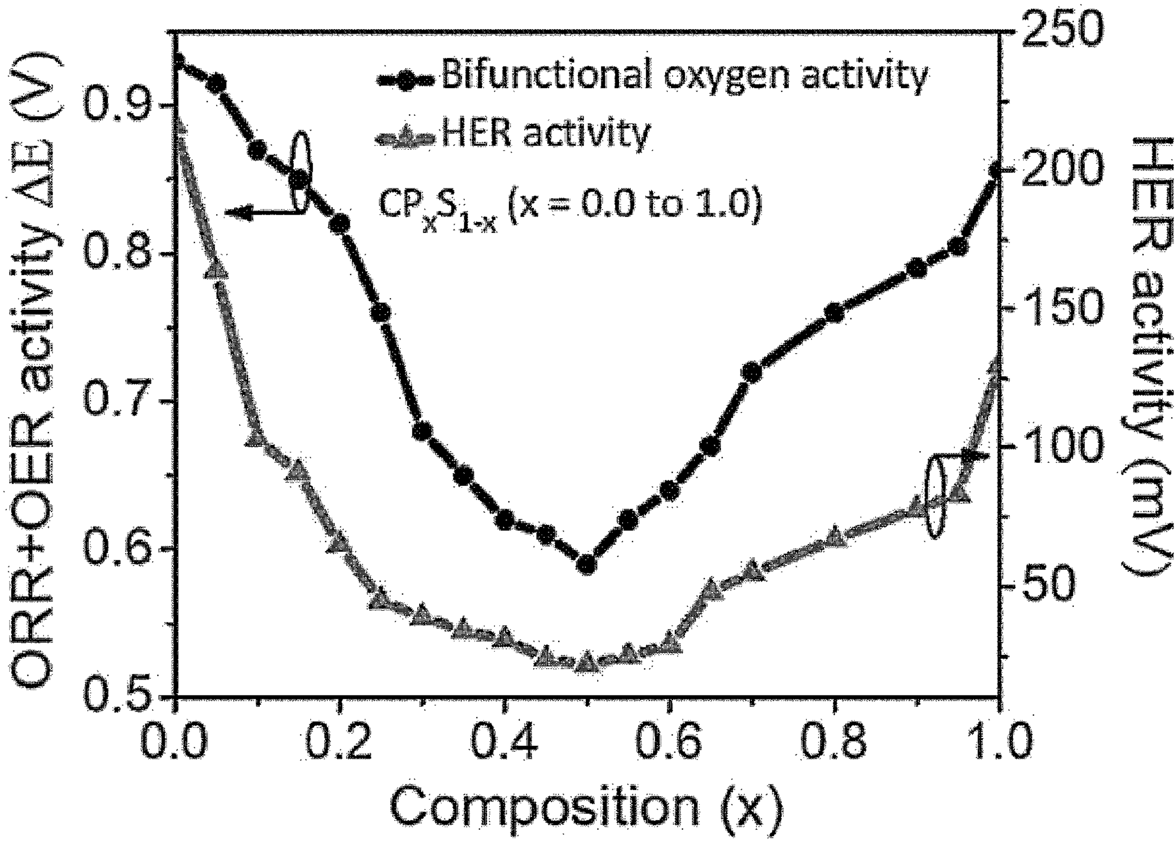
FIG. 30 is a graph showing an evaluation of ORR, OER, and HER properties depending on a composition ratio of P and S in a positive electrode according to Experimental Example 3 of the present application.

FIG. 30 is a graph showing an evaluation of ORR, OER, and HER properties according to a composition ratio of P and S in a positive electrode according to Experimental Example 3 of the present application.

Referring to FIG. 30, the ORR, OER, and HER properties according to a composition ratio of P and S were measured and shown with regard to the CuPS electrode structure according to Experimental Example 3.

As can be understood from FIG. 30, it can be confirmed for the CuPS electrode structure that ORR, OER and HER properties are excellent when a composition ratio of P is more than 0.3 and less than 0.7 and a composition ratio of S is less than 0.7 and more than 0.3. In other words, it can be confirmed for the CuPS electrode structure that controlling of the composition ratio of P to be more than 0.3 and less than 0.7 and the composition ratio of S to be less than 0.7 and more than 0.3 is an efficient method capable of improving ORR, OER and HER properties.

Figure 31:
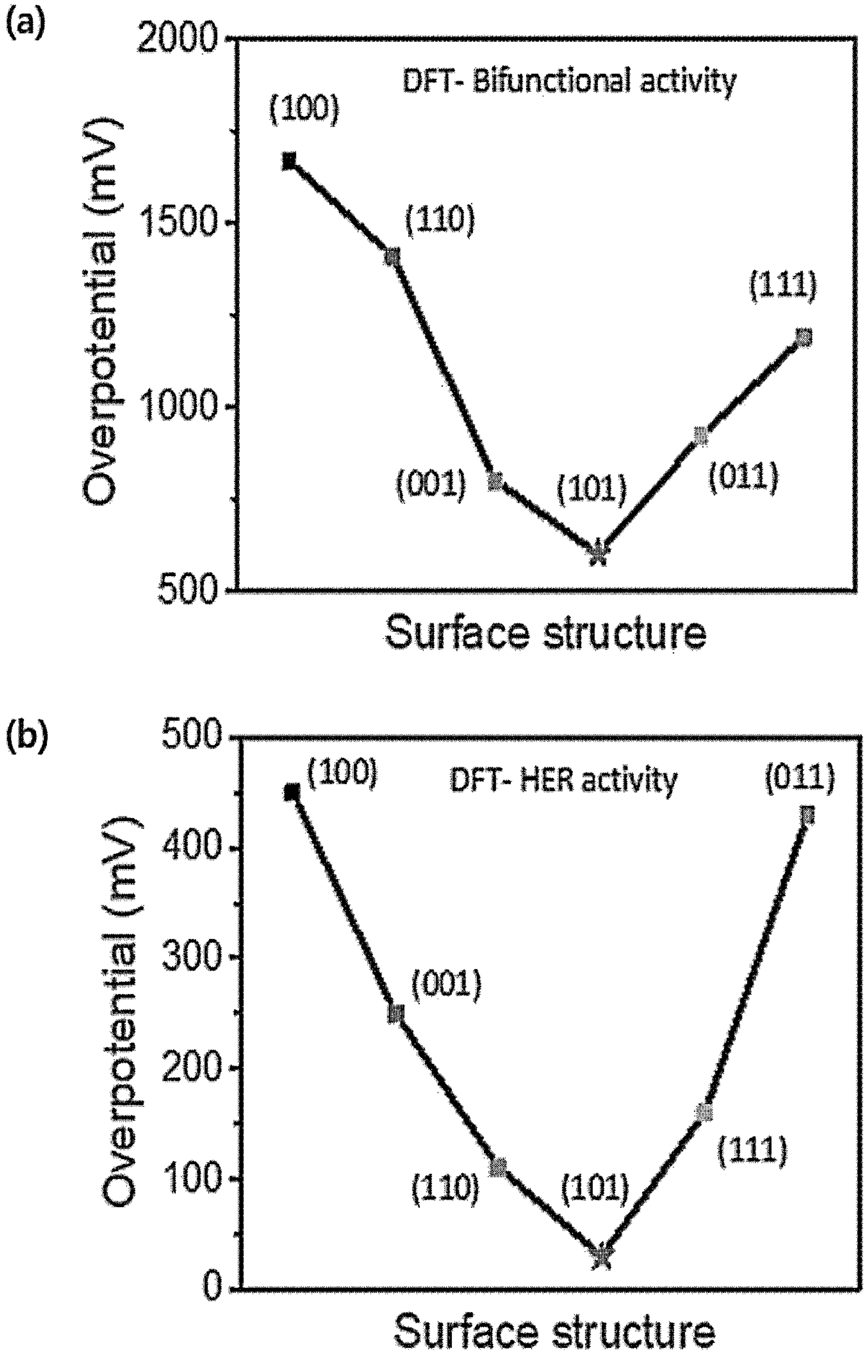
FIG. 31 is a graph showing an evaluation of OER, ORR, and HER properties according to a crystal plane in a positive electrode according to Experimental Example 3 of the present application.

FIG. 31 is a graph showing an evaluation of OER, ORR, and HER properties according to a crystal plane in a positive electrode according to Experimental Example 3 of the present application.

Referring to FIG. 31, according to the crystal plane of the CuPS electrode structure according to Experimental Example 3, overpotentials for OER and ORR reactions (bifunctional activity) and overpotentials for HER reactions were calculated using discrete Fourier transforms.

As can be understood from FIG. 31, it can be confirmed that an overpotential value of the crystal plane 101 is the lowest, and thus ORR, OER and HER properties of the electrode structure in which the crystal plane 101 is developed are improved according to the embodiment of the present application.

In conclusion, it can be seen that fabricating of the positive electrode having a crystal plane 101 developed and using the same as a positive electrode of a zinc-air battery is an efficient method for improving the charge/discharge properties of the zinc-air battery.

Figure 32:
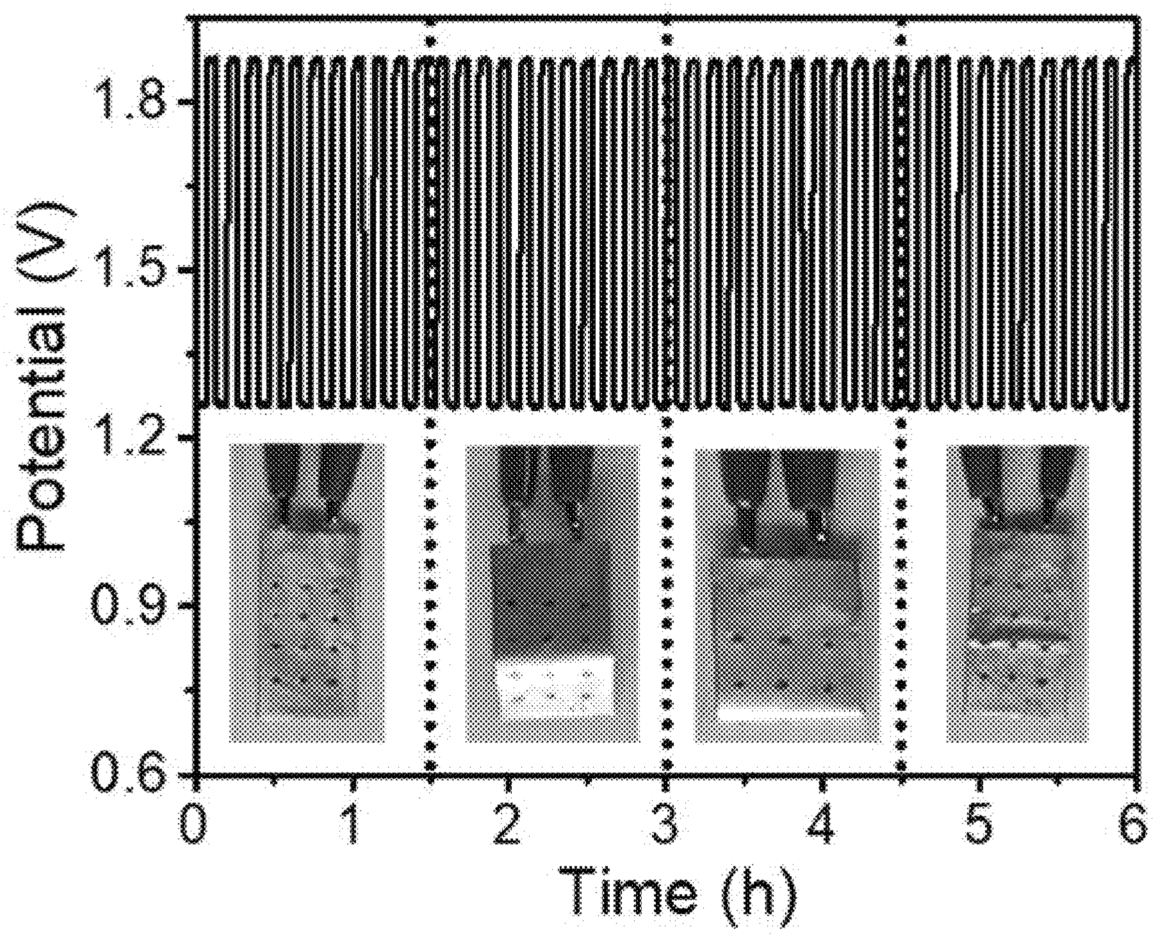
FIG. 32 is a graph for explaining charge/discharge properties in a bent state of a second battery according to Experimental Example 4 of the present application.

FIG. 32 is a graph for explaining charge/discharge properties in a bent state of a second battery according to Experimental Example 4 of the present application.

Referring to FIG. 32, charge/discharge was performed under the condition of 25 $mAcm^{-2}$ while sequentially bending at 0°, 90°, 180°, and 0° for the secondary battery according to Experimental Example 4.

As can be understood from FIG. 32, it can be confirmed that the secondary battery according to Experimental Example 4 has no substantial effect on charge/discharge properties even when bent at various angles. In other words, it can be confirmed that a flexible secondary battery may be implemented with the negative electrode, the solid electrolyte, and the positive electrode according to an embodiment of the present application.

Figure 33:
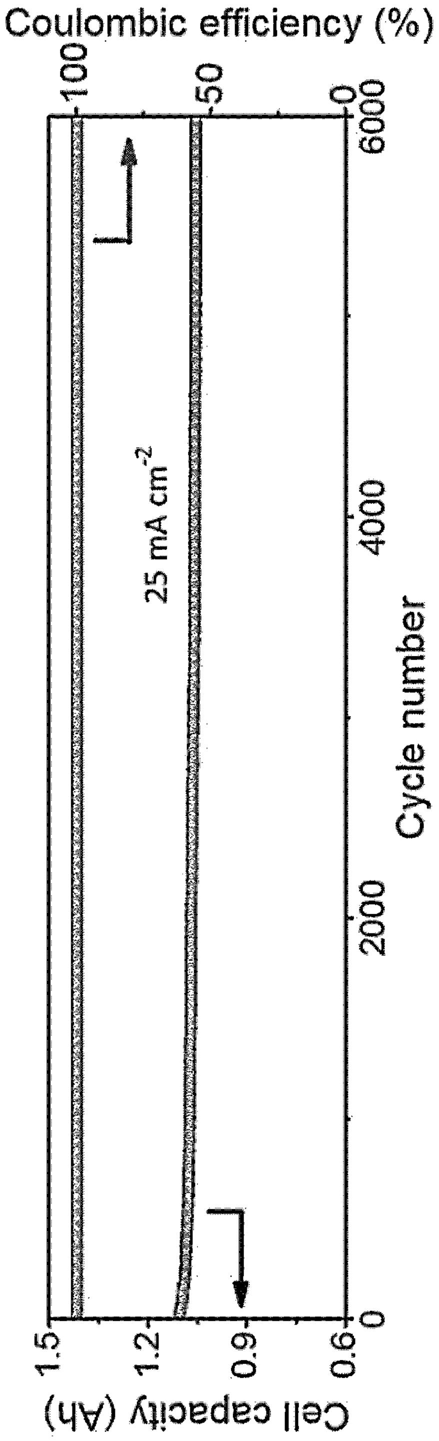
FIG. 33 is a graph for explaining a change in capacity and efficiency depending on the number of charges/discharges in a bent state of a second battery according to Experimental Example 4 of the present application.

FIG. 33 is a graph for explaining a change in capacity and efficiency depending on the number of charges/discharges in a bent state of a second battery according to Experimental Example 4 of the present application.

Referring to FIG. 33, a secondary battery according to Experimental Example 4 was bent at 180° and charge/discharge was performed under the condition of 25 $mAcm^{-2}$.

As can be understood from FIG. 33, it can be confirmed that the secondary battery is stably driven without any substantial decline in charge/discharge capacity and coulombic efficiency even when the number of charge/discharge cycles is performed in a state of being bent at 180°.

Figure 34:
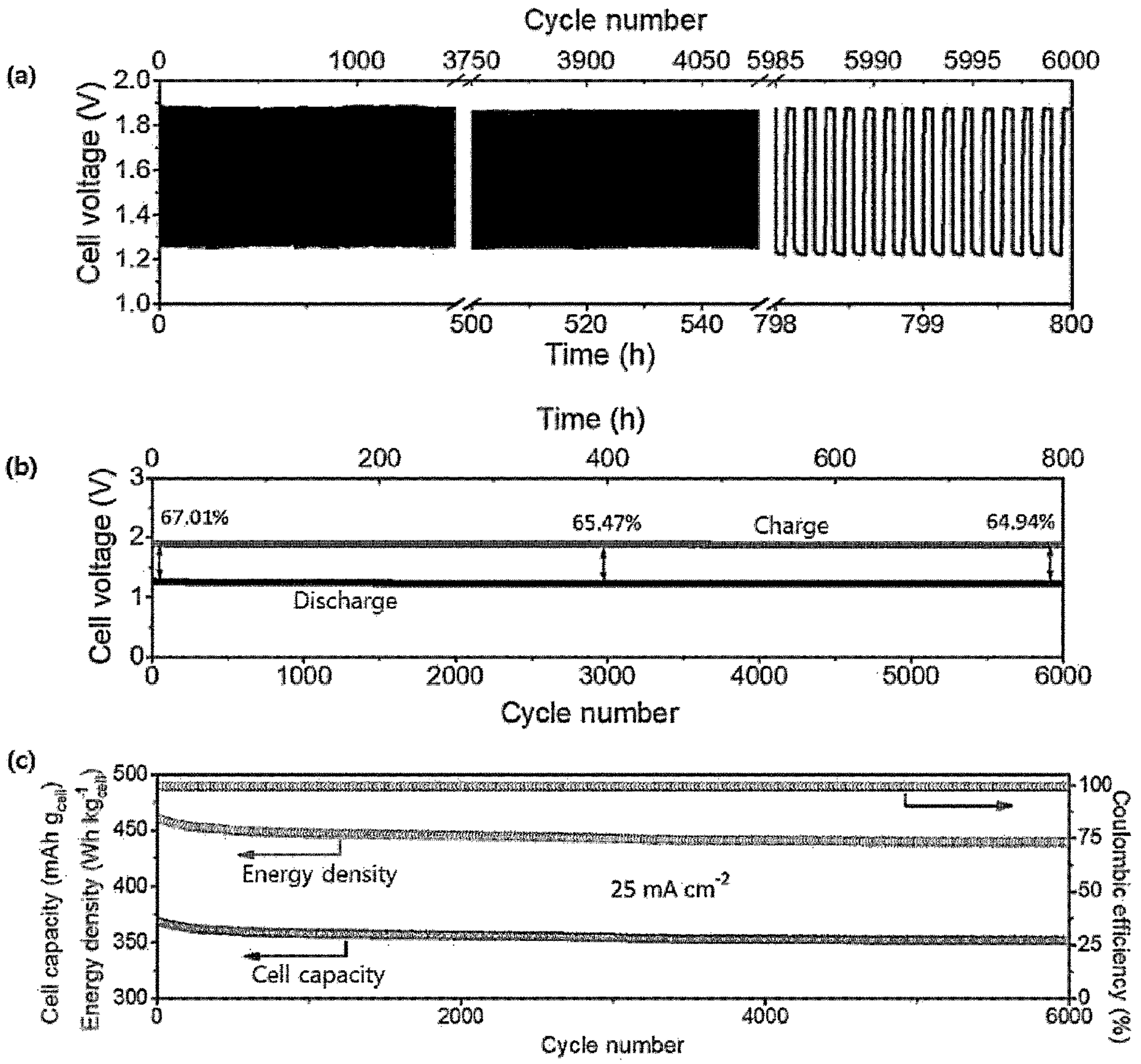
FIG. 34 is a graph showing an evaluation of long-term stability in a bent state of a second battery according to Experimental Example 4 of the present application.

FIG. 34 is a graph showing an evaluation of long-term stability in a bent state of a second battery according to Experimental Example 4 of the present application.

Referring to FIG. 34, a secondary battery according to Experimental Example 4 was bent at 180° and charge/discharge was performed 6,000 times for eight hours under the condition of 25 $mAcm^{-2}$.

As can be understood from FIG. 34, it can be confirmed that the secondary battery according to Experimental Example 4 is stably driven in a bent state, and there is no substantial degradation in properties in the bent state even when the number of times of charging and discharging is increased.

Figure 35:
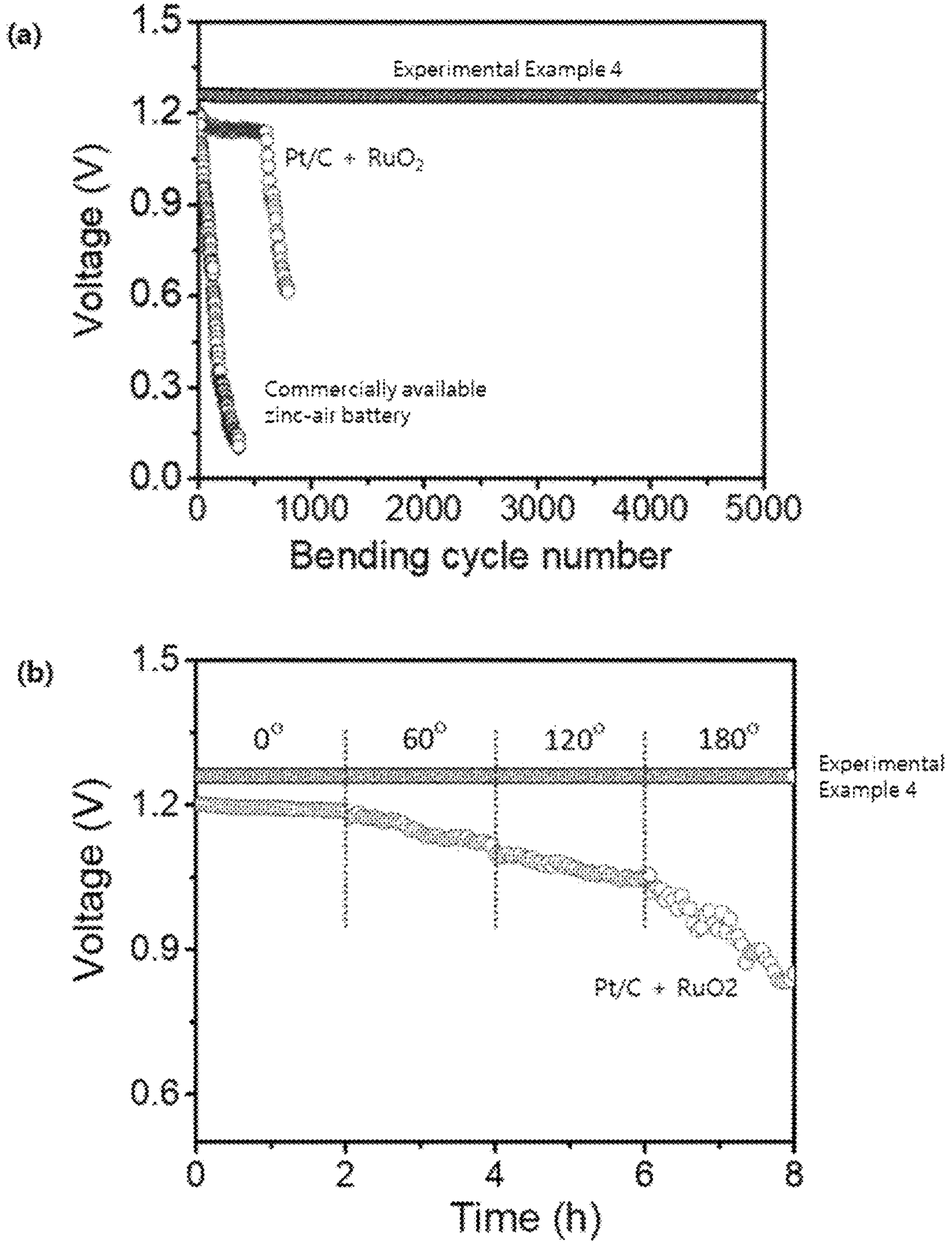
FIG. 35 is a graph for comparing charge/discharge properties in a bent state of a second battery according to Experimental Example 4 of the present application with those of another battery.

FIG. 35 is a graph for comparing charge/discharge properties in a bent state of a second battery according to Experimental Example 4 of the present application with those of another battery.

Referring to FIG. 35, a secondary battery ($Pt/C+RuO_2$) was prepared by exchanging the positive electrode with Pt/C and $RuO^2$ in the secondary battery according to Experimental Example 4, a commercially available zinc-air battery was manufactured by using PVA electrolyte, zinc foil, and Pt/C and $RuO_2$, and the charge/discharge properties were compared with other secondary batteries of Experimental Example 4 in a bent state.

As can be understood from FIG. 35, in the case of a commercialized zinc-air battery, it can be seen that the properties are rapidly deteriorated in a bent state, and thus the charge/discharge operations cannot be performed. In the case of a zinc-air battery including Pt/C and $RuO_2$ positive electrode, it was found that the charge/discharge properties are rapidly deteriorated as a bending angle is increased.

In contrast, it can be confirmed that the secondary battery according to Experimental Example 4 of the present application is stably driven without any change in charge/discharge properties at various bending angles.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

A secondary battery having a bending structure according to an embodiment of the present application may be utilized in various fields of industry such as portable mobile devices, energy storage devices, batteries for electric cars, etc.

The invention claimed is:

1. A secondary battery comprising a positive electrode, a solid electrolyte, and a negative electrode, wherein the positive electrode comprises a compound of copper, phosphorus, and sulfur;

the solid electrolyte comprises bacterial cellulose having chitosan bound thereto;

a chitosan content in the solid electrolyte is more than 30 wt % and less than 70 wt %;

a stack structure having the positive electrode and the solid electrolyte stacked together is provided;

the stack structure is bent to provide a bending region therebetween; and the negative electrode is provided within the bending region.

2. The secondary battery of claim 1, wherein an inner surface of the bending region comprises the solid electrolyte, and thus the negative electrode comes into contact with the solid electrolyte; and wherein the negative electrode has a plurality of grooves.

3. The secondary battery of claim 1, wherein the stack structure comprising the positive electrode and the solid electrolyte stacked together, and the negative electrode provided in the bending region are defined as a unit cell, wherein the unit cell is provided in plurality, and wherein the plurality of unit cells are stacked on each other so that the positive electrodes included in the unit cells adjacent to each other come into contact with each other.

4. The secondary battery of claim 3, wherein a plurality of the stacked unit cells are defined as a cell structure, wherein the cell structure is provided in plurality, and wherein the plurality of cell structures are disposed so that the positive electrodes included in the cell structures come into contact with each other.

5. The secondary battery of claim 1, wherein the stack structure comprising the positive electrode and the solid electrolyte stacked together, and the negative electrode provided in the bending region form a unit cell, wherein the unit cell is provided in plurality, wherein the plurality of unit cells are stacked on each other so that the positive electrodes included in the unit cells adjacent to each other are adjacent to each other, and wherein the second battery further comprises a gas diffusion layer disposed between the unit cells adjacent to each other.

6. The secondary battery of claim 5, wherein the plurality of stacked unit cells and the gas diffusion layer disposed between the unit cells are defined as a cell structure, and wherein the cell structure is disposed so that the positive electrodes come into contact with each other.

7. The secondary battery of claim 1, wherein the stack structure is bent toward a first side and a second side facing the first side, and wherein the negative electrode is provided in a first bending region bent toward the first side, and the positive electrodes of the stack structure come into contact with each other and are folded in a second bending region bent toward the second side.

8. The secondary battery of claim 7, wherein a plurality of the stack structures are alternately and repeatedly stacked toward the first side and the second side to provide a plurality of first bending regions and a plurality of second bending regions, wherein the negative electrode is provided in at least one of the plurality of first bending regions, and the positive electrodes of the stack structure come into contact with each other in the plurality of second bending regions, and wherein the negative electrode provided in the at least one of the plurality of first bending regions is sandwiched between opposing surfaces of the solid electrolyte in the first bending region.

9. The secondary battery of claim 8, wherein the stack structure comprising the positive electrode and the solid electrolyte stacked together, and the plurality of negative electrodes provided in the plurality of first bending regions are defined as a cell structure, wherein the cell structure is provided in plurality, and wherein the plurality of cell structures are disposed so that the positive electrodes included in the cell structures come into contact with each other.

10. The secondary battery of claim 7, wherein a plurality of the stack structures are alternately and repeatedly stacked toward the first side and the second side to provide a plurality of first bending regions and a plurality of second bending regions, and wherein a plurality of negative electrodes are provided in the plurality of first bending regions, respectively, and a plurality of gas diffusion layers are provided within the plurality of second bending regions.

11. The secondary battery of claim 10, wherein the stack structure, the plurality of negative electrodes provided in the plurality of first bending regions, and the plurality of gas diffusion layers provided in the plurality of second bending regions are defined as a cell structure, wherein the cell structure is provided in plurality, and wherein the plurality of cell structures are disposed so that the positive electrodes included in the cell structures come into contact with each other.

12. The secondary battery of claim 1, wherein:

the positive electrode uses oxygen as a positive electrode active material; and the negative electrode comprises zinc.

13. The secondary battery of claim 1, wherein the positive electrode and the solid electrolyte are in a form of a membrane in which a plurality of fibers form a network.

* * * * *